(12) United States Patent
Shimomoto et al.

(10) Patent No.: US 12,282,764 B2
(45) Date of Patent: Apr. 22, 2025

(54) ELECTRONIC APPARATUS, INFORMATION PROCESSING SYSTEM, AND INFORMATION PROCESSING METHOD

(71) Applicants: Ryoh Shimomoto, Tokyo (JP); Tomoki Shibukawa, Tokyo (JP); Genki Watanabe, Tokyo (JP)

(72) Inventors: Ryoh Shimomoto, Tokyo (JP); Tomoki Shibukawa, Tokyo (JP); Genki Watanabe, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 520 days.

(21) Appl. No.: 16/896,281

(22) Filed: Jun. 9, 2020

(65) Prior Publication Data
US 2020/0409685 A1 Dec. 31, 2020

(30) Foreign Application Priority Data
Jun. 28, 2019 (JP) ................................ 2019-121880

(51) Int. Cl.
 *G06F 9/44* (2018.01)
 *G06F 8/65* (2018.01)
 (Continued)

(52) U.S. Cl.
 CPC .................. *G06F 8/65* (2013.01); *G06F 8/71* (2013.01); *G06Q 10/10* (2013.01); *G06Q 20/1235* (2013.01); *G06Q 30/0641* (2013.01)

(58) Field of Classification Search
 CPC ....................................................... G06F 8/65
 (Continued)

(56) References Cited

U.S. PATENT DOCUMENTS 6,829,704 B2 * 12/2004 Zhang ....................... G06F 8/61
   713/1
7,555,657 B2 * 6/2009 Nasu ......................... G06F 8/65
   717/172
(Continued)

FOREIGN PATENT DOCUMENTS

EP  3410331 A1 * 12/2018
JP  2002132368 A * 5/2002
(Continued)

*Primary Examiner* — Evral E Bodden
(74) *Attorney, Agent, or Firm* — XSENSUS LLP

(57) ABSTRACT

An electronic apparatus for acquiring a program via a network, includes an input unit configured to receive a user operation, and circuitry configured to display, on a display, a list including a plurality of versions of firmware programs installable on the electronic apparatus, download a specific firmware program included in the list or a particular firmware program not included in the list, update a current firmware program being installed on the electronic apparatus with the downloaded specific firmware program or the particular firmware program; and enable function of the updated firmware program. When updating with the specific firmware program, in response to a designation operation, the circuitry enables functionality of the specific firmware program. When updating with the particular firmware program not included in the list, the circuitry enables functionality of the particular firmware program having the upgraded function version after updating the particular firmware program.

20 Claims, 21 Drawing Sheets

(51) Int. Cl.
*G06F 8/71* (2018.01)
*G06Q 10/10* (2023.01)
*G06Q 20/12* (2012.01)
*G06Q 30/0601* (2023.01)

(58) Field of Classification Search
USPC .......................................................... 717/173
See application file for complete search history.

(56) References Cited

U.S. PATENT DOCUMENTS

| | | | | |
|---|---|---|---|---|
| 7,681,191 | B2* | 3/2010 | Yuuki | G06F 8/65 |
| | | | | 713/192 |
| 8,972,969 | B2* | 3/2015 | Gaither | G06F 8/656 |
| | | | | 717/170 |
| 9,093,050 | B1* | 7/2015 | Orlov | G06F 8/65 |
| 10,185,475 | B2* | 1/2019 | Choi | H04B 1/3822 |
| 10,565,534 | B2* | 2/2020 | Delacourt | G06Q 10/06313 |
| 10,795,595 | B2* | 10/2020 | Nachimuthu | G06F 3/067 |
| 2003/0217171 | A1* | 11/2003 | Von Stuermer | G11B 27/036 |
| | | | | 709/231 |
| 2005/0010915 | A1* | 1/2005 | Chen | G06F 8/65 |
| | | | | 717/176 |
| 2007/0107067 | A1* | 5/2007 | Fountian | G06F 8/60 |
| | | | | 726/33 |
| 2012/0117555 | A1* | 5/2012 | Banerjee | G06F 8/65 |
| | | | | 717/168 |
| 2013/0167132 | A1* | 6/2013 | Ou Yang | G06F 8/654 |
| | | | | 717/171 |
| 2014/0082139 | A1 | 3/2014 | Shimomoto | |
| 2014/0337928 | A1 | 11/2014 | Hirakata et al. | |
| 2015/0263907 | A1 | 9/2015 | Negishi | |
| 2016/0056879 | A1 | 2/2016 | Shimomoto | |
| 2016/0077781 | A1 | 3/2016 | Shimomoto | |
| 2016/0112395 | A1 | 4/2016 | Hirakata et al. | |
| 2016/0344816 | A1 | 11/2016 | Shimomoto | |
| 2017/0060517 | A1 | 3/2017 | Shimomoto | |
| 2017/0102906 | A1 | 4/2017 | Shimomoto et al. | |
| 2018/0054247 | A1 | 2/2018 | Shimomoto | |
| 2018/0145958 | A1 | 5/2018 | Hirakata et al. | |
| 2018/0219972 | A1* | 8/2018 | Vintzel | G06F 8/61 |
| 2019/0199703 | A1 | 6/2019 | Hirakata et al. | |
| 2019/0361653 | A1 | 11/2019 | Shimomoto | |
| 2019/0370141 | A1* | 12/2019 | Choi | G06F 11/3466 |
| 2020/0012488 | A1* | 1/2020 | Koval | G06F 9/4401 |

FOREIGN PATENT DOCUMENTS

| | | | |
|---|---|---|---|
| JP | 5232427 | B2 * | 7/2013 |
| JP | 2015-176502 | | 10/2015 |

* cited by examiner

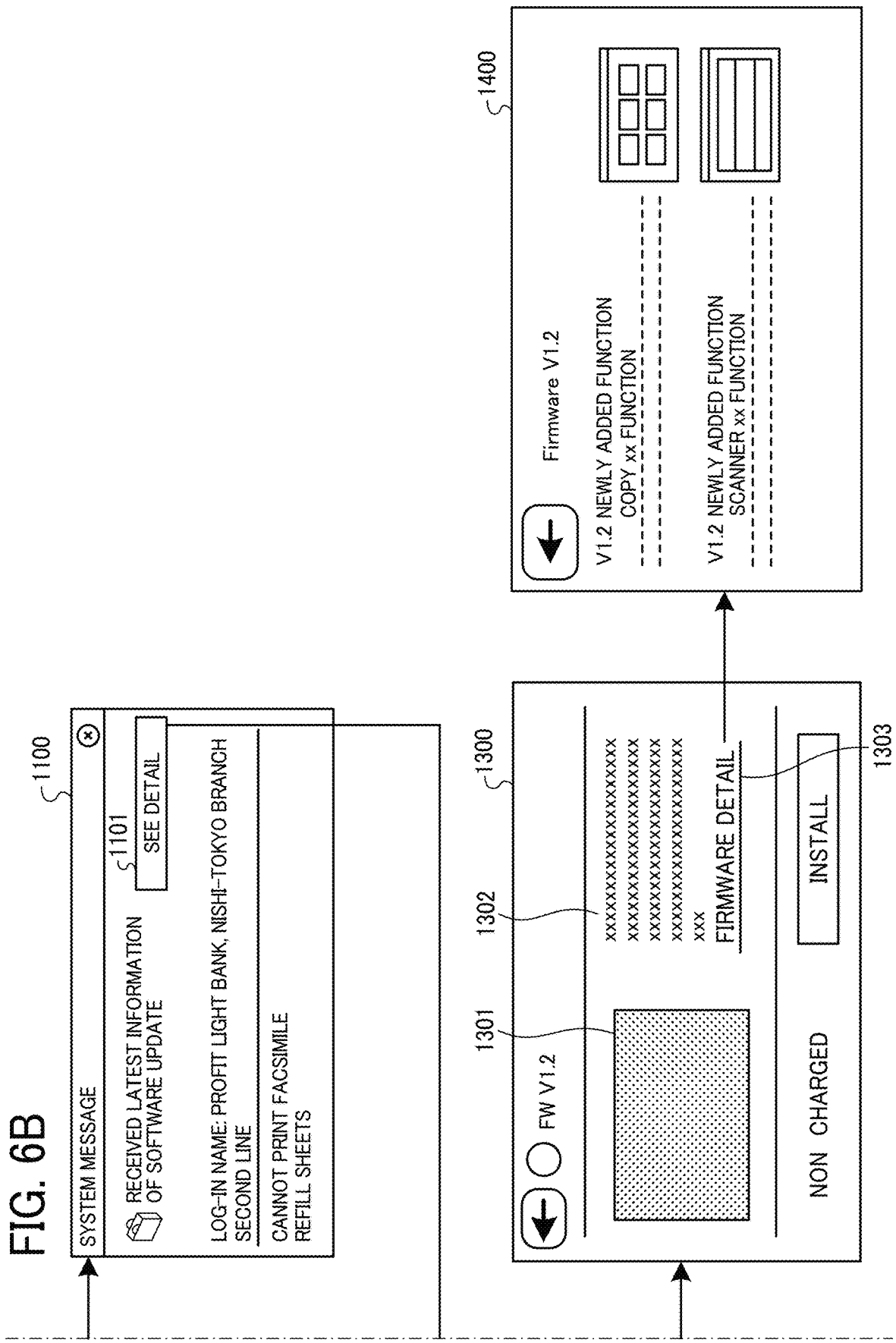

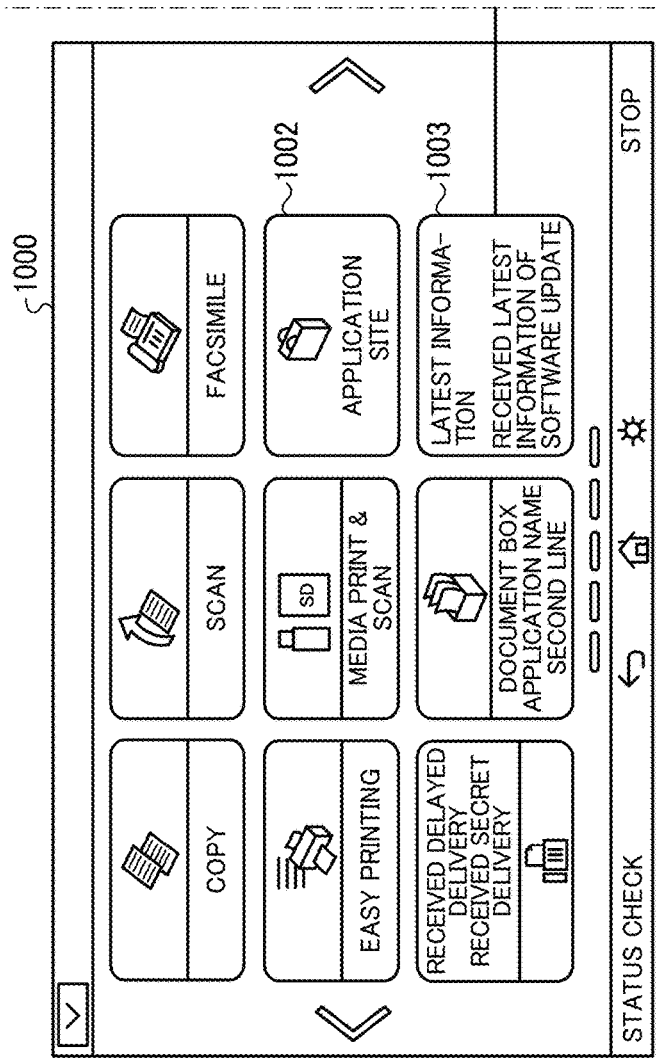

| VERSION / FUNCTION | V1.0 | 1.1 | 1.2 | ... | 2.0 |
|---|---|---|---|---|---|
| FUNCTION A | O | O | O | | O |
| FUNCTION B | | O | O | | O |
| FUNCTION C | | | O | | O |
| FUNCTION D | | | | | O |
| FUNCTION E | | | | | O |

FUNCTION VERSION RANGE THAT CAN BE ACTIVATED WHEN MAXIMUM FUNCTION VERSION IS V1.2

ACTIVATED FUNCTION VERSION = CURRENT FUNCTION VERSION

FIG. 15

UPDATE OF FIRMWARE IS REQUIRED BECAUSE FUNCTION VERSION EXCEEDS MAXIMUM FUNCTION VERSION OF FIRMWARE

MAXIMUM FUNCTION VERSION

| VERSION / FUNCTION | V1.0 | 1.1 | 1.2 | 1.3 | ... | 2.0 |
|---|---|---|---|---|---|---|
| FUNCTION A | O | O | O | O | | O |
| FUNCTION B | | O | O | O | | O |
| FUNCTION C | | | O | O | | O |
| FUNCTION D | | | | O | | O |
| FUNCTION E (CHARGED) | | | | | | O |

CAN BE ACTIVATED WITHOUT UPDATING FIRMWARE

CURRENT FUNCTION VERSION

ELECTRONIC APPARATUS, INFORMATION PROCESSING SYSTEM, AND INFORMATION PROCESSING METHOD

CROSS-REFERENCE TO RELATED APPLICATION

This application claims priority pursuant to 35 U.S.C. § 119(a) to Japanese Patent Application No. 2019-121880, filed on Jun. 28, 2019 in the Japan Patent Office, the disclosure of which is incorporated by reference herein in its entirety.

BACKGROUND

Technical Field

This disclosure relates to an electronic apparatus, an information processing system, and an information processing method.

Background Art

Conventionally, a technique for automatically updating application and firmware for electronic apparatuses, such as multifunction peripheral (MFP), is known. As technology for automatically updating the firmware, technology for downloading and updating firmware from a remote site at the designated time is disclosed.

However, updating of pre-installed software, such as firmware, in electronic apparatuses, such as image forming apparatuses, may be difficult for general users because the updating is complex processing. For example, general users feel difficulty in understanding how to update the firmware from which screen and at which time.

Further, when updating the firmware, various functions can be added, but general users may not be able to select desired functions to newly add functions.

SUMMARY

In one aspect of the present invention, an electronic apparatus for acquiring one or more programs via a network and updating the one or more programs is devised. The electronic apparatus includes an input unit configured to receive a user operation, and circuitry configured to display, on a display, a list including a plurality of versions of one or more firmware programs installable on the electronic apparatus, download a specific firmware program included in the list or a particular firmware program not included in the list, update a current firmware program being installed on the electronic apparatus with the downloaded specific firmware program or the particular firmware program, and enable one or more functions of the updated firmware program installed on the electronic apparatus. In one case of updating with the specific firmware program included in the list, in response to a designation operation using the input unit, the circuitry enables functionality of the specific firmware program designated by the designation operation. In another case of updating with the particular firmware program not included in the list, the circuitry enables functionality of the particular firmware program having the upgraded function version after updating the particular firmware program having the upgraded function version.

In another aspect of the present invention, an information processing system is devised. The information processing system includes a server, and an electronic apparatus connectable with the server via a network, the electronic apparatus capable of acquiring one or more programs via a network and updating the one or more programs. The server, configured to manage one or more firmware programs, includes a memory configured to store the one or more firmware programs to be supplied to the electronic apparatus, and circuitry configured to transmit a list of programs of firmware that can be updated for the electronic apparatus, the list of programs of firmware is to be displayed on a display. The electronic apparatus, configured to download the one or more firmware programs from the server via the network and update the one or more firmware programs, includes an input unit configured to receive a user operation, and another circuitry configured to display, on a display, a list including a plurality of versions of one or more firmware programs installable on the electronic apparatus, download a specific firmware program included in the list or a particular firmware program not included in the list, update a current firmware program being installed on the electronic apparatus with the downloaded specific firmware program or the particular firmware program, and enable one or more functions of the updated firmware program installed on the electronic apparatus. In one case of updating with the specific firmware program included in the list, in response to a designation operation using the input unit, the circuitry enables functionality of the specific firmware program designated by the designation operation. In another case of updating with the particular firmware program not included in the list, the circuitry enables functionality of the particular firmware program having the upgraded function version after updating the particular firmware program having the upgraded function version.

In another aspect of the present invention, a method of acquiring and updating one or more programs for an electronic apparatus via a network is devised. The method includes receiving a user operation to an input unit, displaying, on a display, a list including a plurality of versions of one or more firmware programs installable on the electronic apparatus, downloading a specific firmware program included in the list or a particular firmware program not included in the list, updating a current firmware program being installed on the electronic apparatus with the downloaded specific firmware program or the particular firmware program, and enabling one or more functions of the updated firmware program installed on the electronic apparatus. In one case of updating the specific firmware program included in the list, in response to a designation operation using the input unit, the enabling enables functionality of the specific firmware program designated by the designation operation. In another case of updating the particular firmware program not included in the list, the enabling automatically enables functionality of the particular firmware program after updating the particular firmware program having the upgraded function version.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 6A and 6B illustrate an example of screen transition;

FIGS. 7A and 7B illustrate another example of screen transition;

FIG. 15 illustrates an operation of increasing a current function version;

Figure 1:
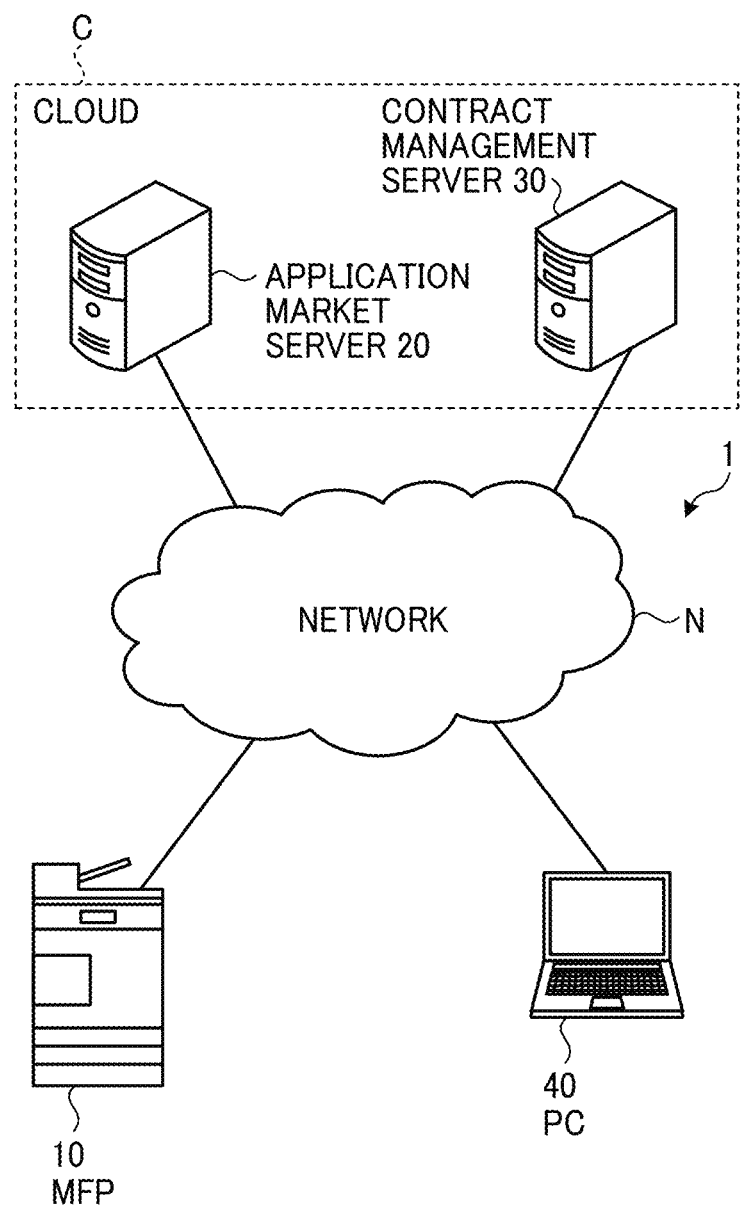
FIG. 1 illustrates an example of configuration of an information processing system according to an embodiment of this disclosure.

The accompanying drawings are intended to depict embodiments of the this disclosure and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an electronic apparatus, an information processing system, and an information processing method according to one or more embodiments of this disclosure in detail with reference to the accompanying drawings. Further, the following embodiments are not limited to the this disclosure, and the components in the following embodiments may include those skilled in the art, substantially identical, and in equivalent range. Further, various omissions, substitutions, modifications, and combinations of components can be made without departing from the scope of the following embodiments.

In this disclosure, computer software is a program related to computer operation, and information which is used for processing by computer equivalent to the program (hereinafter, computer software is referred to as software). An application software is a generic name for software that is used to perform specific tasks, in software classification. An operating system (OS) is software for controlling computers and used for enabling application software to use computer resources. The operating system controls the basic management and control of computers, such as input and output control, memory and hard disk management, process management, and so on. The application software works with the functions provided by the operating system. A program is consisted with computer instructions that are combined to obtain computing results. The information equivalent to the program is not a program that directly instructs to the computer, but is similar to the program because the program equivalent defines a computer processing. For example, a data structure (a logical structure of data, represented by a correlation between data elements) corresponds to the program equivalent.

Hereinafter, a description is given of electronic apparatus according to this disclosure, such as multifunctional peripheral apparatus (MFP), which is an example of image forming apparatus, but it is not limited thereto. For example, the electronic apparatus can be information processing apparatus, such as smartphone, portable telephone, and personal computer (PC), consumer electronics, industrial machine, built-in machine, medical device, or the like. Further, the multifunction peripheral apparatus (MFP) is an apparatus having a plurality of different functions, such as copying function, scanner function, printer function, and facsimile function.

(Configuration of Information Processing System)

FIG. 1 illustrates an example of configuration of an information processing system 1 according to an embodiment. Hereinafter, a description is given of a configuration of the information processing system 1 with reference to FIG. 1.

As illustrated in FIG. 1, the information processing system 1 includes, for example, a multifunction peripheral apparatus (MFP) 10, an application market server 20 (an example of first server), a contract management server 30 (an example of second server), and a PC 40 (an example of information processing apparatus), which are communicatively connected to each other via a network N. The application market server 20 and the contract management server 30 are included in cloud C as the servers for providing cloud services.

The MFP 10 is an image forming apparatus, which is an example of electronic apparatus capable of performing various functions, such as copying function, scanner function, facsimile function, printer function, or the like.

The application market server 20 is a server that provides cloud services, which provides a list screen of one or more programs of application and one or more programs of firmware that can be installed on the MFP 10, and has an application market site, from which one or more programs of application and/or one or more programs of firmware selected by a user can be downloaded and installed on the MFP 10. In this description, the term of "application" may mean one or more programs of application, and the term of "firmware" may mean one or more programs of firmware.

The contract management server 30 is a server that provides cloud services of purchase site, which is used to make a purchase contract for a user who has logged in to a charged application and charged firmware, and manages a purchase contract status in association with tenant identification (ID), user ID, and device ID.

The PC 40 is an information processing apparatus that communicates with the contract management server 30 via the network N to make a purchase contract of charged application or firmware to be installed on the MFP 10.

Further, the service provided by the application market site is not limited to being implemented by the application market server 20 alone, but can be implemented by, for example, using a plurality of servers. The same applies to a purchase site of the contract management server 30.

(Hardware Configuration of MFP)

Figure 2:
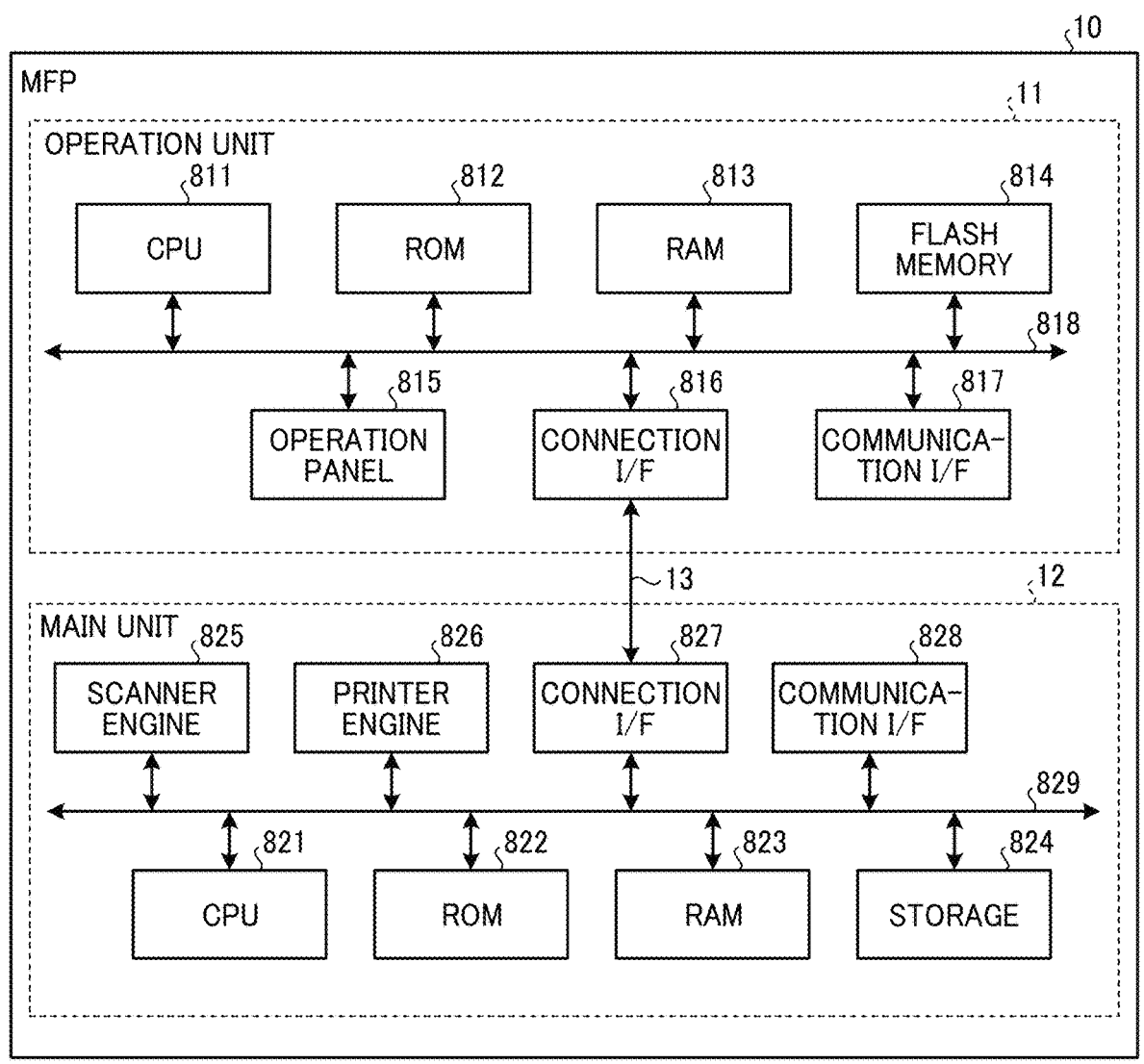
FIG. 2 is a diagram illustrating an example of a block diagram of a hardware configuration of MFP according to the embodiment of this disclosure.

FIG. 2 is an example of a block diagram of a hardware configuration of the MFP 10 according to the embodiment. Hereinafter, a description is given of a hardware configuration of the MFP 10 with reference to FIG. 2.

As illustrated in FIG. 2, the MFP 10 includes, for example, an operation unit 11, and a main unit 12. The operation unit 11 is configured to receive an user operation, and the main unit 12 is configured to implement various image forming functions, such as scanner function, and printer function. In this description, the receiving of user operation includes a process of receiving specific information input by the user operation (including a signal indicating coordinate values on screen).

The operation unit 11 and the main unit 12 are communicatively connected to each other via a communication path 13 dedicated for communication. The communication path 13 employs, for example, universal serial bus (USB) standard, but is not limited thereto. For example, the communication path 13 can employ any standards, such as wired or wireless standards.

The main unit 12 performs an operation corresponding to an operation received by the operation unit 11, which may be performed by a user or others. Further, the main unit 12 can also communicate with an external device, and can perform an operation corresponding to an instruction received from the external device.

(Hardware Configuration of Operation Unit)

As illustrated in FIG. 2, the operation unit 11 includes, for example, a central processing unit (CPU) 811, a read only memory (ROM) 812, a random access memory (RAM) 813, a flash memory 814, an operation panel 815, a connection interface (I/F) 816, a communication interface (I/F) 817, and a bus 818.

The CPU 811 is a computing device that controls operations of the operation unit 11 entirely. The CPU 811 controls the operation of the operation unit 11 entirely by executing programs stored in the ROM 812 or flash memory 814 using the RAM 813 as a work area. For example, the CPU 811 implements various functions, such as displaying information (image) corresponding to the input received from a user on the operation panel 815.

The ROM 812 is a nonvolatile memory that stores basic input/output system (BIOS), various settings, or the like that are executed at the time of activating the operation unit 11. The RAM 813 is a volatile memory that is used as a work area of the CPU 811. The flash memory 814 is a nonvolatile storage device for storing, for example, operating system (OS), application programs, and various data.

The operation panel 815 is a device having a function that receives various inputs corresponding to the user operation, and having an input function and a display function for displaying various information (e.g., information corresponding to received operation, information indicating operation state of the MFP 10, and setting information). The operation panel 815 includes, for example, a liquid crystal display (LCD) device equipped with a touch panel function. The operation panel 815 is not limited to the liquid crystal display device, but can be made of, for example, an organic electro-luminescence (OEL) display device equipped with a touch panel function. Further, the operation panel 815 may include an operation unit such as a hardware key or a display unit such as a lamp, in addition to or in place of the touch panel function.

The connection I/F 816 is an interface for communicating with the main unit 12 via the communication path 13.

The communication I/F 817 is a network interface for connecting the operation unit 11 to the network N and communicating with an external device connected to the network N. The communication I/F 817 corresponds to, for example, Ethernet (registered trademark), and is an interface capable of communication conforming to transmission control protocol/internet protocol (TCP/IP) or the like.

The bus 818 is a transmission path that connects each of the above-described components to each other, and transmits address signals, data signals, and various control signals.

Further, the hardware configuration of the operation unit 11 illustrated in FIG. 2 is just one example, and may include components other than the components illustrated in FIG. 2.

(Hardware Configuration of Main Unit)

As illustrated in FIG. 2, the main unit 12 includes, for example, a CPU 821, a ROM 822, a RAM 823, a storage 824, a scanner engine 825, a printer engine 826, a connection I/F 827, a communication I/F 828, and a bus 829.

The CPU 821 is a computing device that controls operations of the main unit 12. The CPU 821 controls the operation of the main unit 12 entirely by executing programs stored in the ROM 822 or the storage 824 using the RAM 823 as a work area. For example, the CPU 821 implements various functions, such as copy function, scanner function, facsimile function, and printer function.

The ROM 822 is a nonvolatile memory that stores BIOS, various settings, or he like that are executed when activating the main unit 12. The RAM 823 is a volatile memory that is used as a work area of the CPU 821. The storage 824 is a nonvolatile storage device that stores, for example, operating system (OS), various application programs, and various data. The storage 824 can be, for example, a hard disk drive (HDD), a solid state drive (SSD) or the like.

The scanner engine 825 is a hardware that performs a scanner function to scan and read a document as an image, among the image forming functions, which is other than general purpose information processing and processing communication.

The printer engine 826 is a hardware that performs a printer function of printing on a print medium such as paper or the like, among image forming functions, which is other than general purpose information processing and processing communication.

The connection I/F 827 is an interface for communicating with the operation unit 11 via the communication path 13.

The communication I/F 828 is a network interface for connecting the main unit 12 to the network N and communicating with an external device connected to the network N. The communication I/F 828 is an interface that corresponds to, for example, Ethernet and that is capable of communication conforming to TCP/IP or the like.

The bus 829 is a transmission path that connects each of the above-described components to each other, and transmits address signals, data signals, and various control signals.

Further, the hardware configuration of the main unit 12 illustrated in FIG. 2 is just one example. The main unit 12 may include components other than those illustrated in FIG. 2. For example, the main unit 12 may include a finisher that sorts printed media, or a particular option such as auto document feeder (ADF) which automatically feeds documents.

(Hardware Configuration of Application Market Server)

Figure 3:
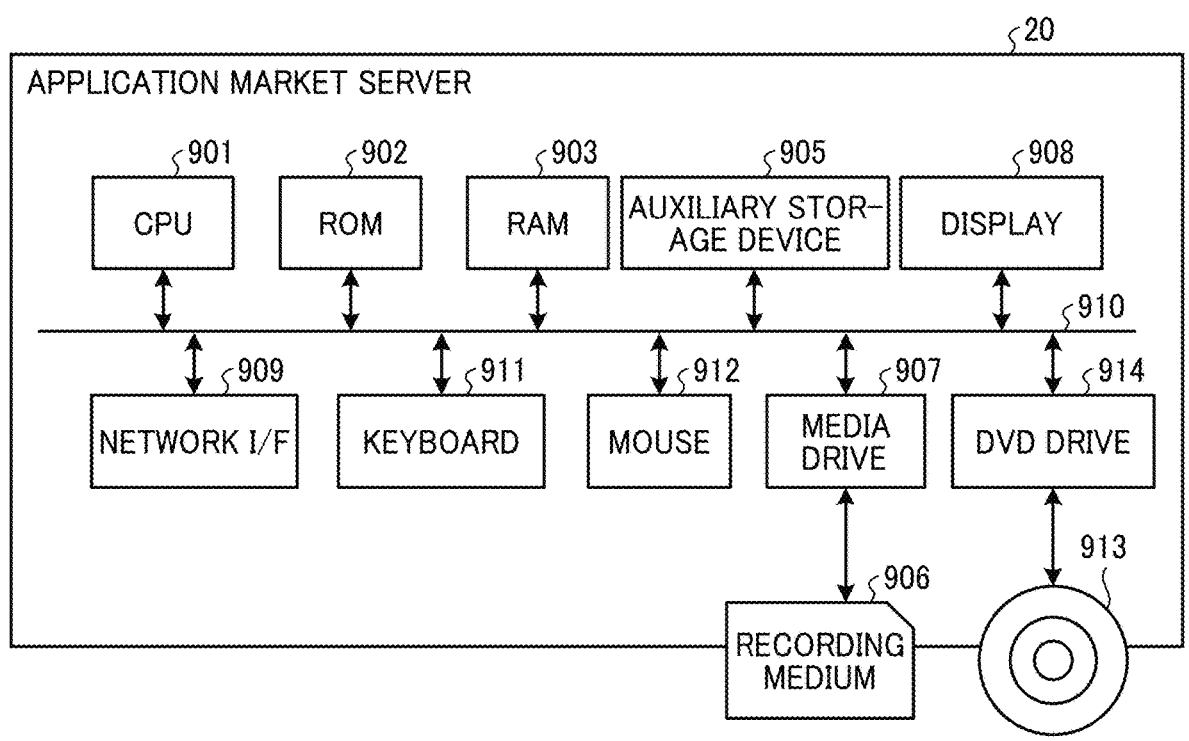
FIG. 3 illustrates an example of a block diagram of a hardware configuration of an application market server according to the embodiment of this disclosure.

FIG. 3 illustrates an example of a block diagram of a hardware configuration of the application market server 20 according to the embodiment. Hereinafter, a description is given of a hardware configuration of the application market server 20 with reference to FIG. 3.

As illustrated in FIG. 3, the application market server 20 includes, for example, a CPU 901, a ROM 902, a RAM 903, an auxiliary storage device 905, a media drive 907, a display 908, a network I/F 909, a keyboard 911, a mouse 912, and a digital versatile disc (DVD) drive 914.

The CPU 901 is a computing device that controls operations of the application market server 20 entirely. The ROM 902 is a nonvolatile storage device that stores programs for the application market server 20. The RAM 903 is a volatile storage device used as a work area of the CPU 901.

The auxiliary storage device 905 is a storage device such as HDD or SSD, which stores images scanned by the MFP 10 by performing the scanning function.

The media drive 907 is a device that controls reading and writing of data to a recording medium 906, such as flash memory, under the control of the CPU 901.

The display 908 is a display device composed of a liquid crystal or an organic EL that displays various information, such as cursor, menu, window, characters, images, or the like.

The network I/F 909 is an interface for communicating data with an external device such as an MFP 10 using network N. The network I/F 909 is, for example, a network interface card (NIC) conforming to Ethernet, which is compatible with TCP/IP for communication.

The keyboard 911 is an input device used for selecting characters, numbers, various instructions, and a cursor movement. The mouse 912 is an input device for selecting and executing various instructions, selecting an object to be processed, and moving the cursor.

The DVD drive 914 is a device for controlling reading and writing of data to the DVD 913 such as DVD-ROM or digital versatile disk recordable (DVD-R) used as an example of removable storage medium.

The CPU 901, ROM 902, RAM 903, auxiliary storage device 905, media drive 907, display 908, network I/F 909, keyboard 911, mouse 912 and DVD drive 914, as described above, are communicatively connected to each other by a bus line 910 such as an address bus and a data bus.

The hardware configuration of the application market server 20 illustrated in FIG. 3 is just one example, and it is not required to include all of the components illustrated in FIG. 3, or may include any other components.

Further, although the hardware configuration illustrated in FIG. 3 is described as a hardware configuration of the application market server 20, the hardware configuration of the contract management server 30 and the PC 40 is also corresponding to the hardware configuration illustrated in FIG. 3.

(Software Configuration in Information Processing System)

Figure 4:
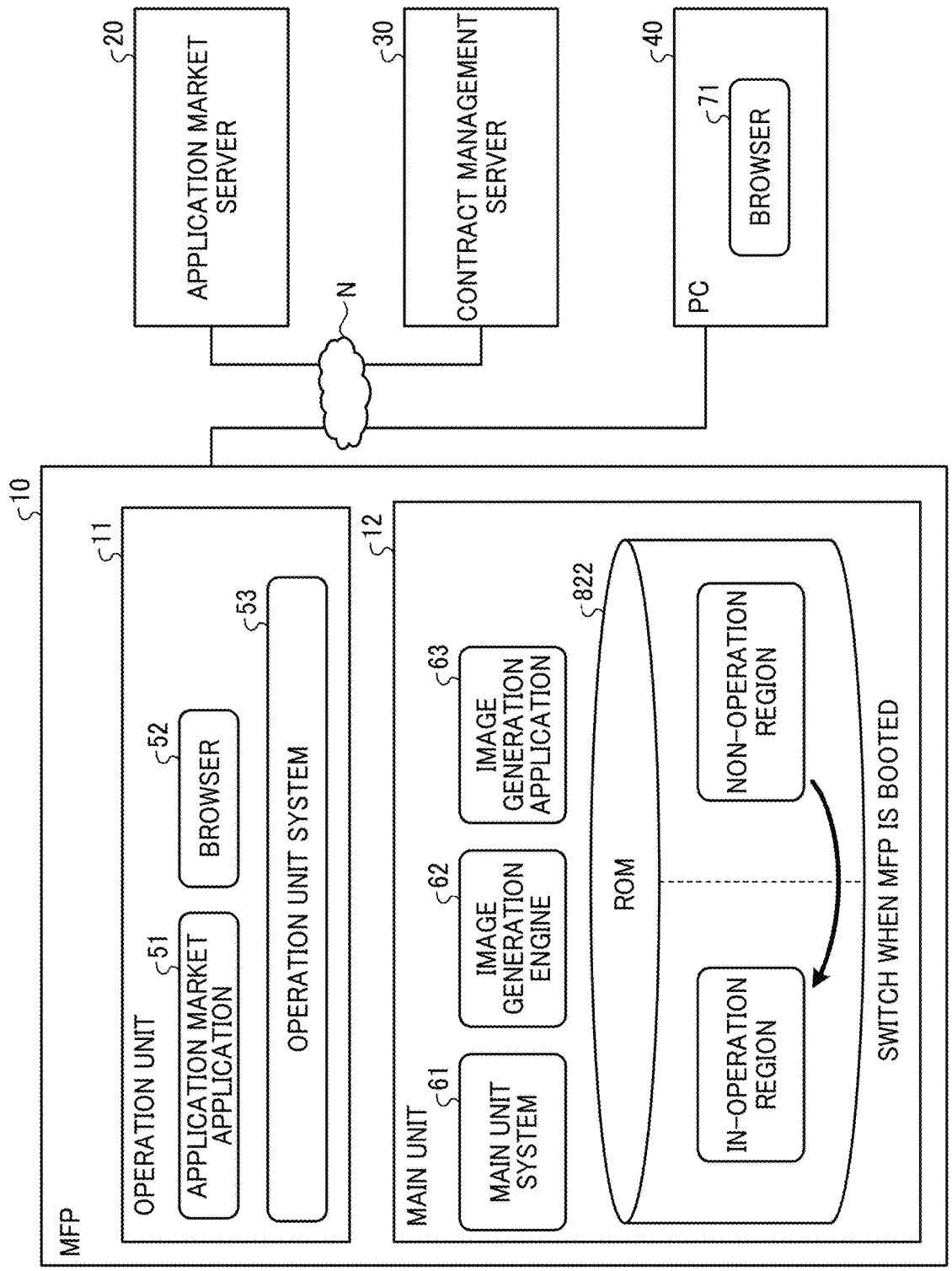
FIG. 4 is an example of software configuration of the information processing system according to the embodiment of this disclosure.

FIG. 4 is an example of software configuration of the information processing system 1 according to the embodiment. Hereinafter, a description is given of a software configuration of the information processing system 1 with reference to FIG. 4.

As illustrated in FIG. 4, the operation unit 11 includes, for example, an application market application 51, a browser 52, and an operation unit system 53.

The application market application 51 is an application that communicates with an application market site provided by the application market server 20 to download application or firmware corresponding to a user operation via the browser 52.

The browser 52 is software that implements functions, such as web applications, by acquiring web contents (e.g., hypertext markup language (HTML), cascading style sheets (CSS), JavaScript (registered trademark), and various electronic files from the application market server 20.

The operation unit system 53 is software that controls operations of the operation unit 11 other than the function implemented by the browser 52.

As illustrated in FIG. 4, the main unit 12 includes, for example, a main unit system 61, an image generation engine 62, and an image generation application 63.

The main unit system 61 is a software that controls the operation of the main unit 12. The image generation engine 62 corresponds to the scanner engine 825 and the printer engine 826 described above. The image generation application 63 is an application that controls the operations of the image generation engine 62. For example, the image generation application 63 includes copy application, scanner application, facsimile application, printer application, or the like.

As illustrated in FIG. 4, the ROM 822 includes a non-operation region and in-operation region. The non-operation region is used to temporarily store a firmware downloaded from the application market server 20 and retaining the firmware at a non-executed state. The in-operation region is used to store a firmware that actually controls the operation of the operation unit 11 and the main unit 12.

As illustrated in FIG. 4, the PC 40 includes, for example, a browser 71. The browser 71 is software that implements functions, such as web applications by obtaining web contents (e.g., HTML, CSS, JavaScript, various electronic files) from the contract management server 30.

(Functional Configuration of Information Processing System)

Figure 5:
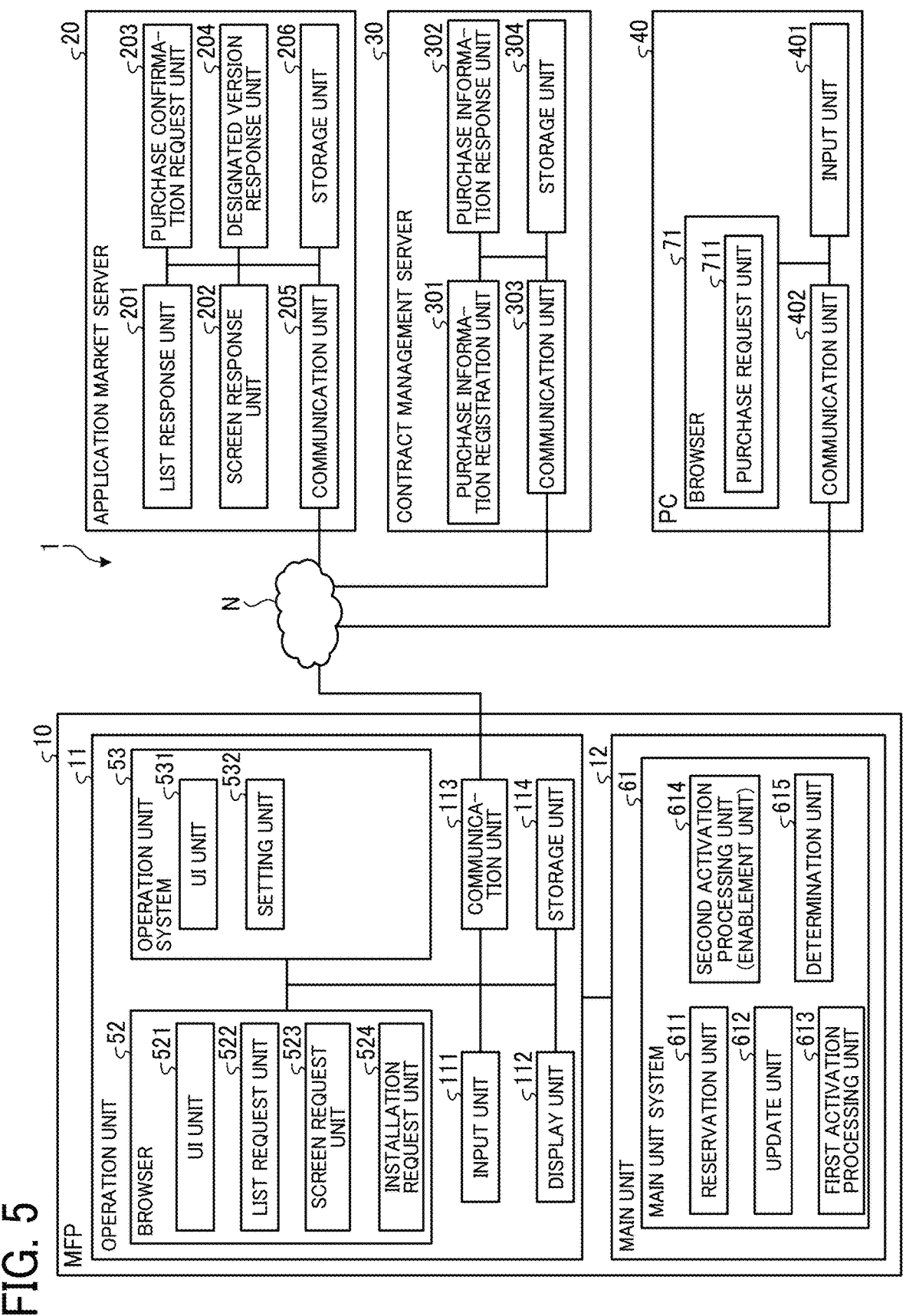
FIG. 5 illustrates an example of a block diagram of a functional configuration of the information processing system according to the embodiment of this disclosure.

FIG. 5 illustrates an example of a block diagram of a functional configuration of the information processing system 1 according to the embodiment. Hereinafter, a description is given of a functional configuration of the information processing system 1 with reference to FIG. 5.

As illustrated in FIG. 5, the operation unit 11 of the MFP 10 includes, for example, the browser 52 and the operation unit system 53, an input unit 111, a display unit 112, a communication unit 113, and a storage unit 114. The browser 52 includes, for example, a user interface (UI) unit 521, a list request unit 522, a screen request unit 523, an installation request unit 524. The operation unit system 53 includes, for example, a UI unit 531, and a setting unit 532.

The UI unit 521 is a functional unit that displays a web page or the like corresponding to content, acquired from the application market server 20, using the display unit 112. Further, the UI unit 521 receives various operations (e.g., press for link) on the web page by an inputting operation by a user to the input unit 111. The UI unit 521 is implemented by executing the browser 52 by the CPU 811 of the operation unit 11 illustrated in FIG. 2.

The list request unit 522 is a functional unit that requests a list of application and firmware installable on the MFP 10 to the application market server 20, in response to an inputting operation performed by a user to the input unit 111. The list request unit 522 is implemented by executing the browser 52 by the CPU 811 of the operation unit 11 illustrated in FIG. 2.

The screen request unit 523 is a functional unit that requests information on various screens, to be displayed using the display unit 112, to the application market server 20 in response to an inputting operation performed by a user to the input unit 111. The screen request unit 523 is implemented by executing the browser 52 by the CPU 811 of the operation unit 11 illustrated in FIG. 2.

The installation request unit 524 is a functional unit that requests the application market server 20 to install a designated firmware in response to an inputting operation performed by a user to the input unit 111. The installation request unit 524 is implemented by executing the browser 52 by the CPU 811 of the operation unit 11 illustrated in FIG. 2.

The UI unit 531 is a functional unit that displays a screen (e.g., home screen, to be described later) for performing various operations of the MFP 10 using the display unit 112. The UI unit 531 is implemented by executing the operation unit system 53 by the CPU 811 of the operation unit 11 illustrated in FIG. 2.

The setting unit 532 is a functional unit that sets various settings, in response to an inputting operation performed by a user to the input unit 111 on various setting screens (e.g., automatic update setting screen, automatic activation setting screen, to be described later), displayed using the display unit 112. The setting unit 532 is implemented by executing the operation unit system 53 by the CPU 811 of the operation unit 11 illustrated in FIG. 2.

The input unit 111 is a functional unit that receives an inputting operation performed by a user. The input unit 111 is implemented by an input function of the operation panel 815 illustrated in FIG. 2.

The display unit 112 is a functional unit that displays various information in accordance with the instructions of the UI unit 521 and the UI unit 531. The display unit 112 is implemented by a display function of the operation panel 815 illustrated in FIG. 2.

The communication unit 113 is a functional unit that performs data communication with the application market server 20 via the network N in under the control of the browser 52. The communication unit 113 is implemented by the communication I/F 817 and executing the program by the CPU 811 illustrated in FIG. 2.

The storage unit 114 is a functional unit that stores various data. For example, the storage unit 114 stores setting information set on an automatic update setting screen and an automatic activation setting screen, to be described later. The storage unit 114 is implemented by the RAM 813 or flash memory 814 illustrated in FIG. 2.

As illustrated in FIG. 5, the main unit 12 of the MFP 10 includes, for example, a reservation unit 611, an update unit 612, a first activation processing unit 613, a second activation processing unit 614 (enablement unit), and a determination unit 615.

When a user designates or selects a firmware having a function version, the reservation unit 611 reserves an enabling of function corresponding to the function version after updating the designated firmware. In this description, the enabling of function corresponding to the function version of firmware that is installed (updated) may be also referred to as the activation of function. The information of function corresponding to the function version reserved by the reservation unit 611 may be temporarily stored, for example, in the RAM 823 or storage 824 illustrated in FIG. 2. The reservation unit 611 is implemented by executing the main unit system 61 by the CPU 821 of the main unit 12 illustrated in FIG. 2.

The update unit 612 is a functional unit that updates a firmware downloaded from the application market server 20 via the communication unit 113 into the non-operational region of the ROM 822 (an example of the storage unit) illustrated in FIG. 4. The update unit 612 is implemented by executing the main unit system 61 by the CPU 821 of the main unit 12 illustrated in FIG. 2.

The first activation processing unit 613 is a functional unit that copies a firmware updated in the non-operation region of the ROM 822 by the update unit 612 to the in-operation region of the ROM 822, and executes the firmware when the MFP 10 is activated (booted) or rebooted. The first activation processing unit 613 is implemented by the main unit system 61 executed by the CPU 821 of the main unit 12 illustrated in FIG. 2.

The second activation processing unit 614 activates the function corresponding to the function version of the firmware that is designated by a user, for the firmware installed in the ROM 822.

Further, the timing of activating by the second activation processing unit 614 can be at a time of updating a downloaded firmware in the non-operation region of the ROM 822 (when the firmware is copied into the in-operation region by the first activation processing unit 613 and the firmware is executed, the function is in an activated state) or at a time of copying the firmware to the in-operation region of the ROM 822 by the first activation processing unit 613. The second activation processing unit 614 is implemented by executing the main unit system 61 by the CPU 821 of the main unit 12 illustrated in FIG. 2.

Thus, by updating the pre-installed firmware and the application of the electronic apparatus, such as the MFP 10, the latest function can be added to the electronic apparatus. This technology is referred to as "always current technology (ACT)" in the embodiment. The electronic equipment equipped with the ACT function can acquire, via the network N, the latest function that was not installed at the time of purchase as a firmware package, and can add the latest function as the function.

Further, the firmware package for adding the function via the network N becomes public at a given time on the application market server 20 that is an acquisition destination of firmware. Therefore, the time lag between the development of the function to be added to the electronic equipment and the installation of the function can be reduced, and thereby the new function can be added to the electronic apparatus in a timely manner. Further, conventionally, a user may buy the electronic apparatus for utilizing new function. In the embodiment, since the user is not required to buy the electronic apparatus itself for utilizing the new function, the cost of user can be reduced.

The determination unit 615 compares a function version of a firmware designated by a user, the maximum function version that can be activated by the currently-installed firmware, and a currently-activated function version to determine which function is greater. The determination unit 615 is implemented by executing the main unit system 61 by the CPU 821 of the main unit 12 illustrated in FIG. 2.

Further, the functional units of the operation unit 11 and the main unit 12 of the MFP 10 illustrated in FIG. 5 are conceptually illustrated, and are not limited to the configuration of the FIG. 5. For example, a plurality of functional units of the MFP 10 illustrated in FIG. 5 as independent functional functions may be configured as one functional unit. On the other hand, the function of one functional unit of the MFP 10 illustrated in FIG. 5 may be divided into a plurality of functions, and a plurality of functional units may be formed.

Further, for example, in the operation unit 11, the functional unit implemented by the browser 52 and the functional unit implemented by the operation unit system 53 do not need to be clearly distinguished from each other, and the functional unit implemented by the browser 52 may be implemented by the operation unit system 53, and vice versa. Further, a software different from the browser 52 and the operation unit system 53 may implement the function of each functional unit.

As illustrated in FIG. 5, the application market server 20 includes, for example, a list response unit 201, a screen response unit 202, a purchase confirmation request unit 203, a designated version response unit 204, a communication unit 205, and a storage unit 206.

The list response unit 201 is a functional unit that generates a list of application and firmware installable on the MFP 10, and transmits the list of application and firmware to the MFP 10 via the communication unit 205, in response to a request of the list request unit 522 of the MFP 10. The list response unit 201 is implemented by executing the program by the CPU 901 illustrated in FIG. 3.

The screen response unit 202 is a functional unit that transmits information on various screens (e.g., home screen) to the MFP 10 via the communication unit 205, in response to a request of the screen request unit 523 of the MFP 10. The screen response unit 202 is implemented by executing the program by the CPU 901 illustrated in FIG. 3.

The purchase confirmation request unit 203 is a functional unit that requests to the contract management server 30 to confirm whether or not a designated firmware is purchased when receiving an installation request requesting an installation of the designated firmware from the installation request unit 524 of the MFP 10. The purchase confirmation request unit 203 is implemented by executing the program by the CPU 901 illustrated in FIG. 3.

The designated version response unit 204 is a functional unit that responds to the main unit system 61 of the MFP 10, the function version of the firmware which is requested to be installed by the installation request unit 524 of the MFP 10. The designated version response unit 204 is implemented by executing the program by the CPU 901 illustrated in FIG. 3.

The communication unit 205 is a functional unit that performs data communication with the MFP 10 and the contract management server 30 via the network N. The communication unit 205 is implemented by the network I/F 909 and executing the program by the CPU 901 illustrated in FIG. 3.

The storage unit 206 is a functional unit that stores various programs such as applications, firmware and packages combining application and firmware. The storage unit 206 is implemented by the auxiliary storage device 905 illustrated in FIG. 3.

Further, the functional units of the application market server 20 illustrated in FIG. 5 are conceptually illustrated, and are not limited to the configuration of the FIG. 5. For example, a plurality of functional units of the application market server 20 illustrated in FIG. 5 as independent functional functions may be configured as one functional unit. On the other hand, the function of one functional unit of the application market server 20 illustrated in FIG. 5 may be divided into a plurality of functions, and a plurality of functional units may be formed.

As illustrated in FIG. 5, the contract management server 30 includes, for example, a purchase information registration unit 301, a purchase information response unit 302, a communication unit 303, and a storage unit 304.

The purchase information registration unit 301 is a functional unit that stores or registers the function version of the firmware, which is requested to be purchased from the PC 40, in the storage unit 304 as the purchase information in association with user ID of a user who has logged in a purchase site of the contract management server 30, tenant ID, and device ID of the MFP 10. The purchase information registration unit 301 is implemented by executing the program by the CPU 901 illustrated in FIG. 3.

In response receiving a confirmation request of purchase of the designated firmware from the purchase confirmation request unit 203 of the application market server 20, the purchase information response unit 302 transmits the purchase information of the firmware to the application market server 20 via the communication unit 303. The purchase information response unit 302 is implemented by executing the program by the CPU 901 illustrated in FIG. 3.

The communication unit 303 is a functional unit that performs data communication with the application market server 20 and the PC 40 via the network N. The communication unit 303 is implemented by the network I/F 909 and executing the program by the CPU 901 illustrated in FIG. 3.

The storage unit 304 is a functional unit that stores the purchase information or the like described above. The storage unit 304 is implemented by the auxiliary storage device 905 illustrated in FIG. 3.

Further, the functional units of the contract management server 30 illustrated in FIG. 5 are conceptually illustrated, and are not limited to the configuration of the FIG. 5. For example, a plurality of functional units of the contract management server 30 illustrated in FIG. 5 as independent functional functions may be configured as one functional unit. On the other hand, the function of one functional unit of the contract management server 30 illustrated in FIG. 5 may be divided into a plurality of functions, and a plurality of functional units may be formed.

As illustrated in FIG. 5, the PC 40 includes, for example, a purchase request unit 711, an input unit 401, and a communication unit 402.

The purchase request unit 711 is a functional unit that transmits a function version of a firmware to be purchased, which is displayed as a purchase site of the contract management server 30, using the browser 71, along with user ID of a user that has logged in the purchasing site, to the contract management server 30 via the communication unit 402, in response to an inputting operation performed by the user to the input unit 401. The purchase request unit 711 is implemented by executing the program by the CPU 901 illustrated in FIG. 3.

The input unit 401 is a functional unit that receives an inputting operation performed by a user. The input unit 401 is implemented by the keyboard 911 and the mouse 912 illustrated in FIG. 3.

The communication unit 402 is a functional unit that performs data communication with the contract management server 30 via the network N under the control of the browser 71. The communication unit 402 is implemented by the network I/F 909 and executing the program by the CPU 901 illustrated in FIG. 3.

Further, the functional units of the PC 40 illustrated in FIG. 5 are conceptually illustrated, and are not limited to the configuration of the FIG. 5. For example, a plurality of functional units of the PC 40 illustrated in FIG. 5 as independent functional functions may be configured as one functional unit. On the other hand, the function of one functional unit of the PC 40 illustrated in FIG. 5 may be divided into a plurality of functions, and a plurality of functional units may be formed.

Further, the functional units of the MFP 10, the application market server 20, the contract management server 30, and the PC 40 illustrated in FIG. 5 may be implemented by executing various software, but is not limited thereto. For example, at least any functional units may be implemented by a dedicated hardware circuit, such as an integrated circuit.

(Screen and Screen Transition on MFP)

Figure 6A:
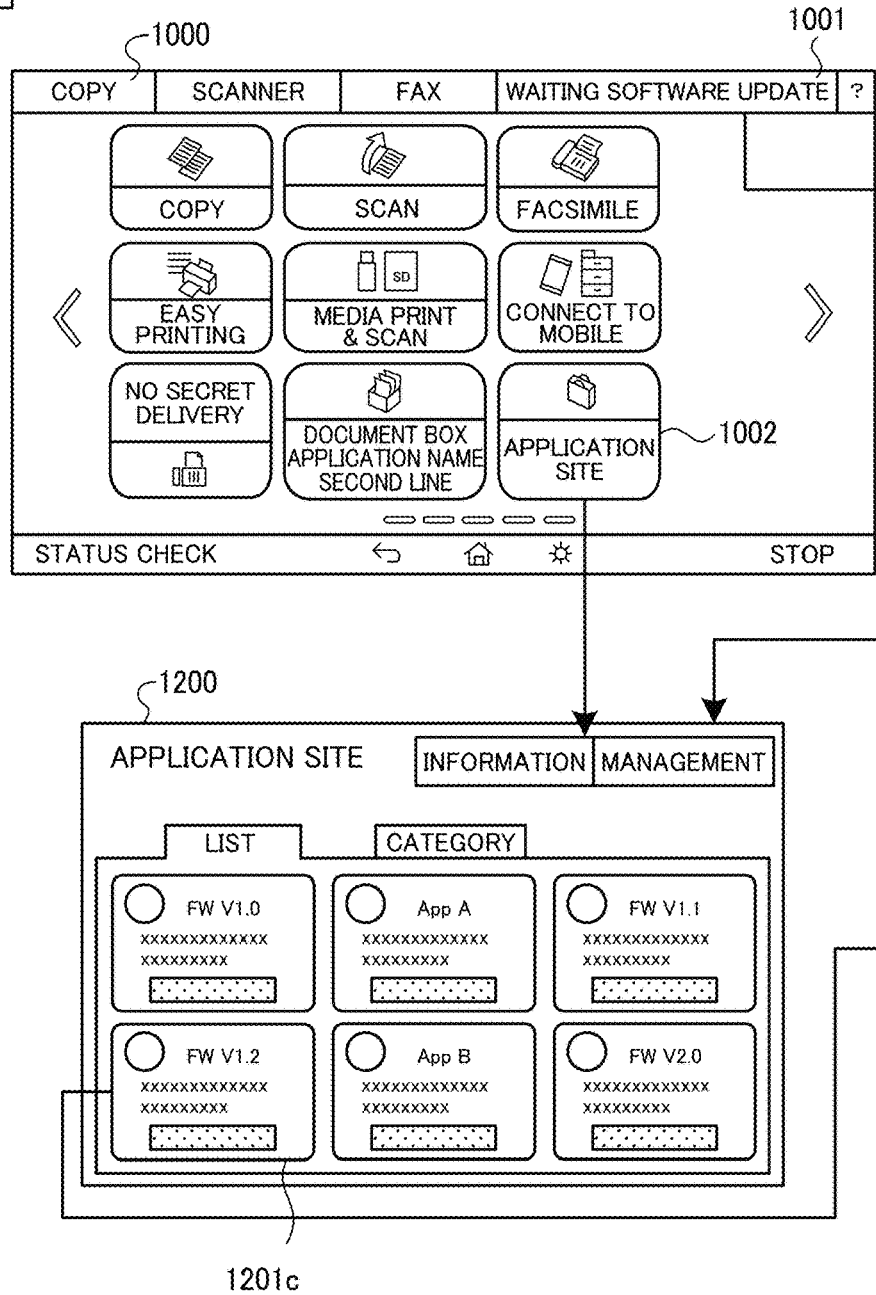
Figure 7B:
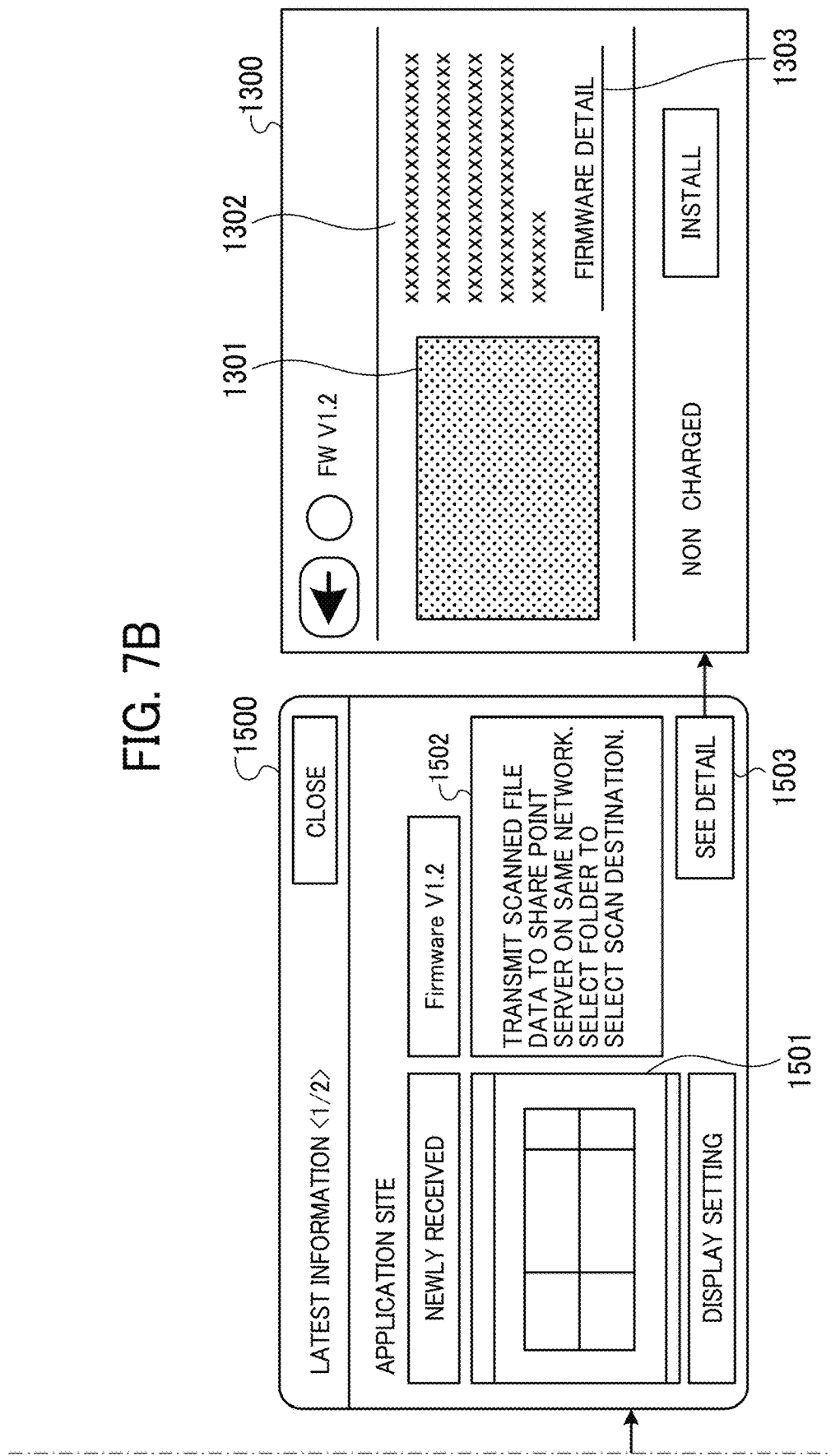
Figure 8:
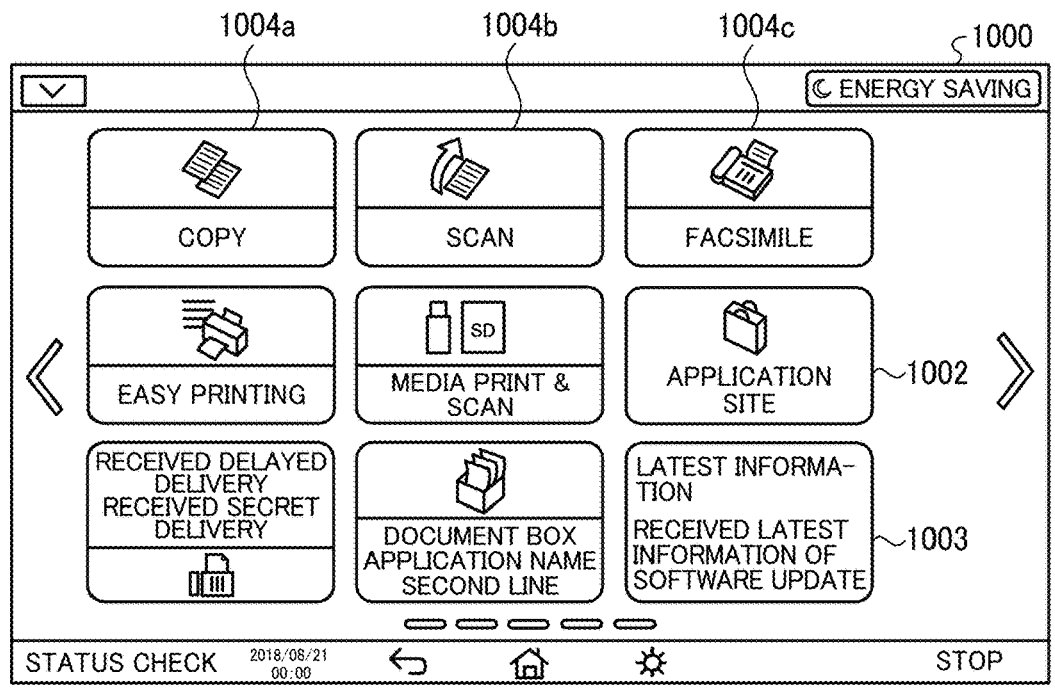
FIG. 8 illustrates an example of home screen.
Figure 9:
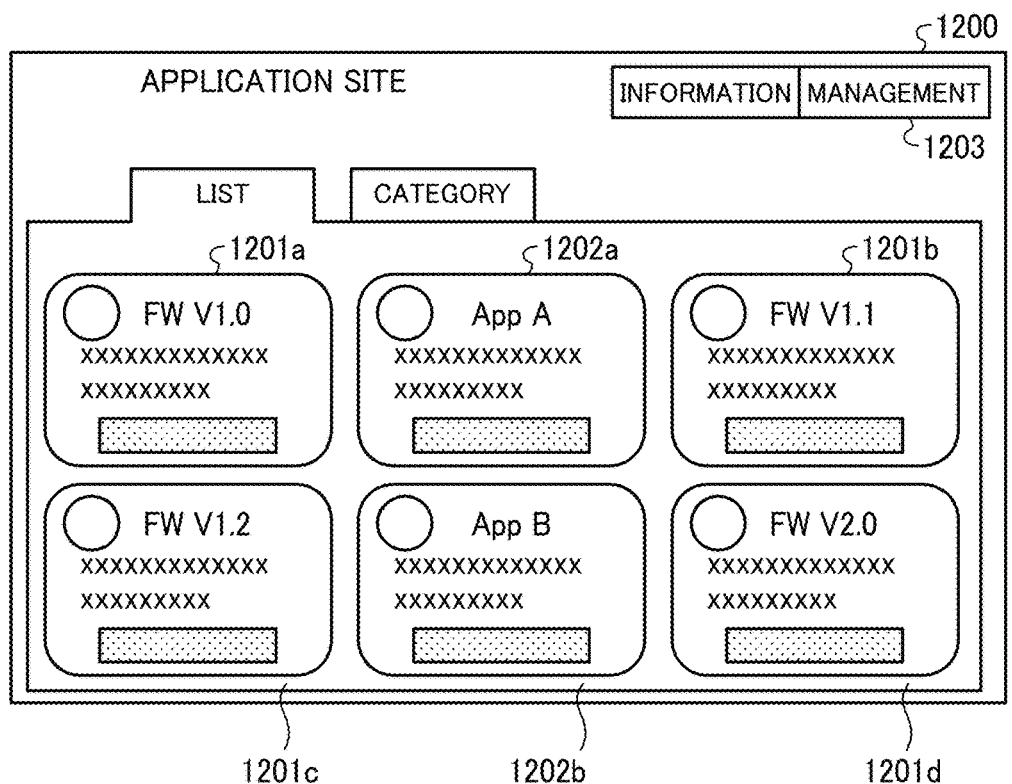
FIG. 9 illustrates an example of list screen of application and firmware, which displays target application and firmware that can be installed from an application site.

FIGS. 6A and 6B illustrate an example of screen transition. FIGS. 7A and 7B illustrate another example of screen transition. FIG. 8 illustrates an example of home screen. FIG. 9 illustrates an example of list screen of application and firmware, which displays target application and firmware that can be installed from an application site.

Figures 10, 11:
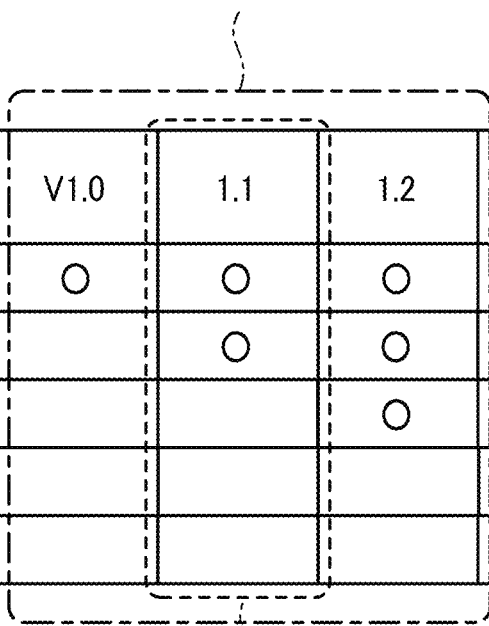
FIG. 10 illustrates an example of function supported by each function version.
FIG. 11 illustrates a relationship between the maximum function version and current function version.

FIG. 10 illustrates an example of function supported by each function version. FIG. 11 illustrates a relationship between the maximum function version and current function version.

Figure 12:
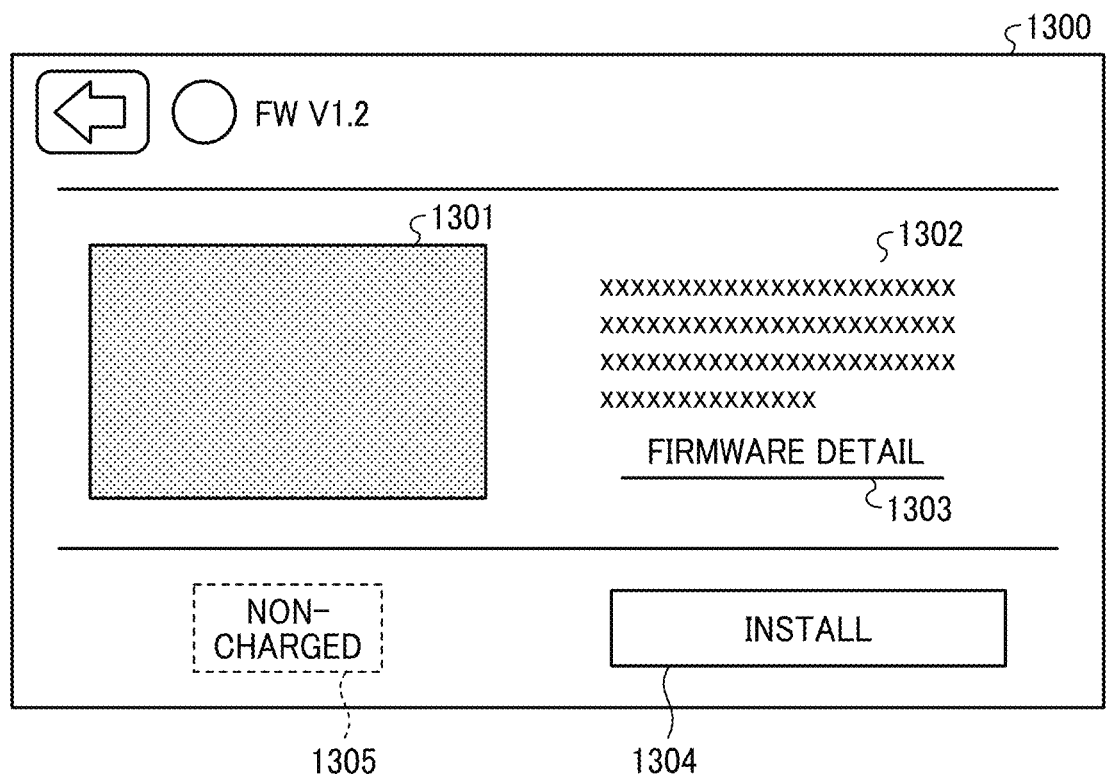
FIG. 12 illustrates an example of installation screen used for installing a non-charged firmware.
Figure 13:
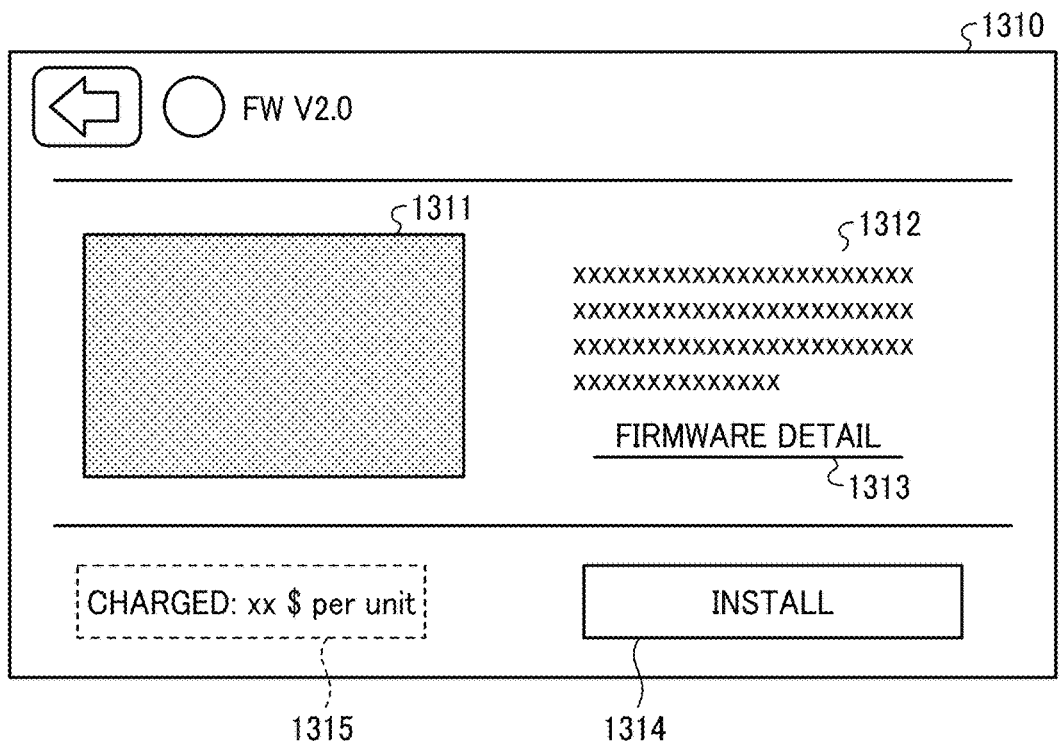
FIG. 13 illustrates an example of installation screen used for installing a charged firmware.
Figure 14:
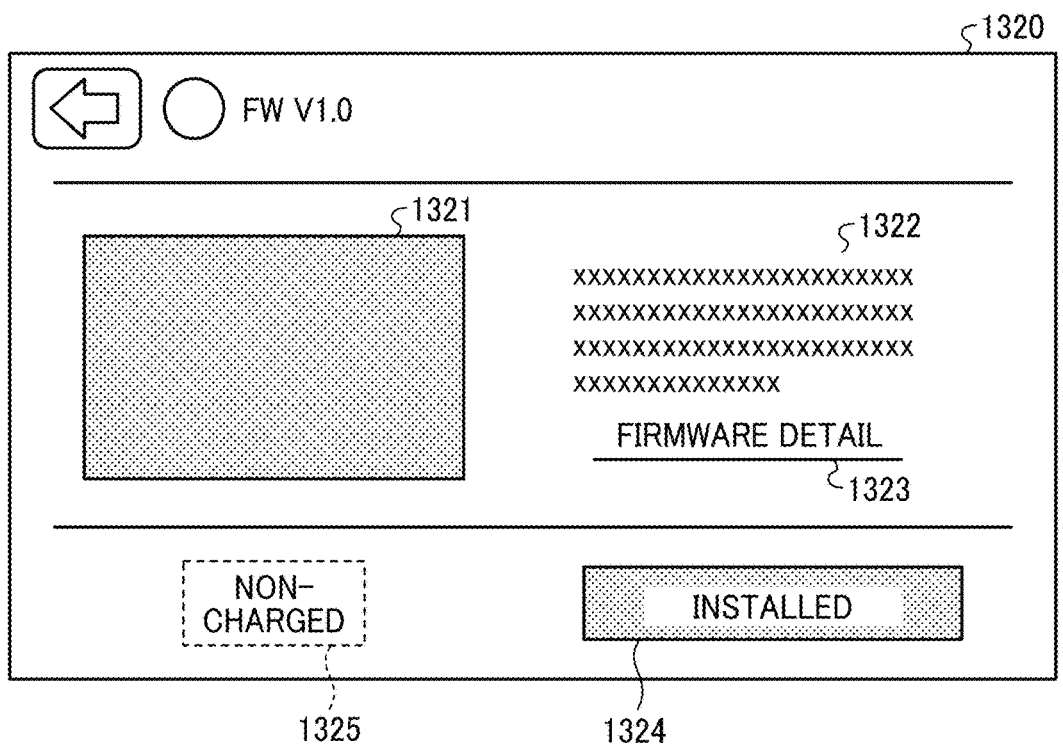
FIG. 14 illustrates an example of installation screen used for an already installed firmware.

FIG. 12 illustrates an example of installation screen used for installing a non-charged firmware. FIG. 13 illustrates an example of installation screen used for installing a charged firmware. FIG. 14 illustrates an example of installation screen used for an already installed firmware.

Hereinafter, a description is given of a screen displayed in the MFP 10 and a flow of screen transition with reference to FIGS. 6 to 14.

Firstly, the screen transition illustrated in FIGS. 6A and 6B is described. As illustrated in FIGS. 6A and 6B, when a user touches a banner display section 1001 on the home screen 1000 being displayed on the display unit 112 of the MFP 10, the UI unit 531 instructs the display unit 112 to display a banner detail dialog box 1100. The banner display section 1001 of the home screen 1000 is a display section used for displaying the latest information of the MFP 10. In an example case of FIGS. 6A and 6B, the banner display section 1001 displays a message indicating "waiting software update" to inform the user that the concerned software can be updated. The banner detail dialog box 1100 is a dialog box used for displaying the details of the latest information being displayed in the banner display section 1001.

As illustrated in FIG. 6B, the banner detail dialog box 1100 has a see detail button 1101 used for displaying the details of the software update information. When a user presses the see detail button 1101, the UI unit 521 instructs the display unit 112 to display a list screen 1200 used for displaying a list of programs of application and firmware that can be installed on the MFP 10 acquired from the application market server 20 by the list request unit 522 as illustrated in FIG. 6A. Further, the list screen 1200 can be also displayed by the UI unit 521 by pressing an application site button 1002 of the home screen 1000.

The list screen 1200 is a screen used for displaying a list of a plurality of programs of application and firmware installable on the MFP 10. The list screen 1200 displays a list of button icons used for installing each application, and button icons used for installing each firmware.

In this description, the "installable application" is not limited to the application that is not currently installed or activated, and also the application that have already been installed or activated. That is, the list screen 1200 displays the list of programs of application and firmware. The application include one or more applications that can be updated, and one or more applications that are already installed. The firmware include one or more programs of firmware that can be updated, one or more programs of firmware that are already installed and function of the one or more programs of firmware can be activated, and one or more programs of firmware that are already installed and function of the one or more programs of firmware is already activated. Further, the list screen 1200 displays the charged application and charged firmware, which are already purchased and not yet purchased.

In an example case of FIG. 9, the list screen 1200 includes buttons corresponding to programs of firmware, such as a firmware button 1201a corresponding to "FW V1.0," a firmware button 1201b corresponding to "FW V1.1," a firmware button 1201c corresponding to "FW V1.2," and a firmware button 1201d corresponding to "FW V2.0."

Further, the list screen 1200 includes, for example, an application button 1202a corresponding to "App A," and an application button 1202b corresponding to "App B" as buttons for applications. Further, the list screen 1200 includes, for example, a management button 1203 used for setting various settings.

Further, the list screen 1200 may display only programs of application and firmware that are not yet installed, or only a list of programs of firmware having function versions that are not yet activated. In this description, one or more programs of application may be referred to as application or applications, and one or more programs of firmware may be referred to as firmware or firmwares.

In this description, for example, "FW V1.1" indicates a firmware having the function version of "V1.1."

Hereinafter, a description is given of a relationship between function version of firmware and function supported by each function version with reference to FIG. 10. In a table illustrated in FIG. 10, the column indicates the function version, and the row indicates the function supported by the firmware, and "circle" in the table indicates that the concerned function is supported. As illustrated in FIG. 10, in general, the firmware increases the support function as the function version of the firmware increases. For example, a firmware having the function version of "V1.0" supports function A alone, and a firmware having the function version of "V1.1" supports function A and function B. The function supported by each firmware include, for example, updating of user interface, and notification function of various information using the banner and widget at the operation unit 11.

Further, the function supported by the charged firmware includes, for example, automatic uploading function of device information, a bidirectional communication function used for forming a dedicated line for setting and installing multiple MFPs remotely, a security function based on image authentication, biometric authentication, and complex authentication, and a workflow creation function used for creating a flow of processing.

Further, the version of firmware includes, for example, several types (e.g., major version, minor version, maintenance version, charged version) to be described later, and depending on the firmware version or the type, the installation and activation is to be performed automatically, or the installation and activation is to be performed based on an operator (user) selection.

For example, the improvement firmware, such as firmware for correcting bug and firmware for antivirus measures, is automatically installed and activated in response to a release of the firmware. On the other hand, as to the firmware including user interface change, the installation is performed automatically, but the activation is performed by an administrator or user selection so that the device or apparatus administrator and user can easily understand or recognize the change of the function.

Further, the installation alone is performed automatically in advance because the enablement (switching) can be performed immediately in response to the user input.

Further, as to the charged firmware, it can be controlled to perform the firmware installation and firmware activation based on a user contract and user selection. By establishing the above described stages, it is possible to improve the user friendliness and user-oriented value without compromising the security and robustness of the device or apparatus related to updating the firmware.

Hereinafter, a description is given of the maximum function version and current function version with reference to FIG. 11.

The maximum function version indicates a function version when all of the functions of the firmware installed on the MFP 10 are activated. For example, when the firmware having the function version of "FW V1.2" is installed, the maximum function version becomes "V1.2." That is, the firmware having the function version of "FW 1.2" has functions A to C, and if the firmware is installed and all of the functions of the firmware are activated, the function version corresponding to activated function A to C becomes "V1.2," which corresponds to the maximum function version is "V1.2."

Further, the current function version indicates a function version that corresponds to the currently activated function, among the functions of the installed firmware. For example, when the firmware having the function version of "FW V1.2" is installed on the MFP 10, the maximum function version is "V1.2." If the firmware having the function version of "FW V1.2" has functions A, B, and C, but the functions A and B alone are activated currently, the function version of "V1.1" corresponding to the functions A and B becomes the current function version. That is, the MFP 10 manages or controls the values of the maximum function version and the current function version as illustrated in the following Table 1 for the firmware installed on the MFP 10.

TABLE 1

| Type of Version | Value |
| --- | --- |
| Maximum function version | V1.2 |
| Current function version | V1.0 |

In an example case of Table 1, a specific firmware having a specific function version of "V1.2" is installed on the MFP 10 and thereby the maximum function version becomes "V1.2." Since the function corresponding to the function version of "V1.0" alone is activated among the function of the specific firmware having the specific function version of "V1.2," the current function version becomes "V1.0."

Further, a description is given of a relationship between the maximum function version and the current function version with reference to FIG. 11 in detail.

If the specific firmware having the specific function version of "V1.2" is installed on the MFP 10, the maximum function version becomes "V1.2" as described above. In this case, the specific firmware having the specific function version of "V1.2" has a potential of providing functions A to C. If the specific firmware having the specific function version of "V1.2" is actually installed on the MFP 10, the functions corresponding to the function versions of "V1.0", "V1.1," and "V1.2" can be activated, respectively. For example, as illustrated in FIG. 11, if the function corresponding to the function version of "V1.1" is activated, functions A and B are provided, but function C is not provided. In other words, the function of concerned firmware is enabled for the first time when the concerned firmware is installed and further activated.

Referring back to FIGS. 6A and 6B, the operation of the screen transition is further described. As to the list displayed on the list screen 1200 displayed by the UI unit 521, the user presses a button of specific firmware or a button of specific application, that the user desires to install. For example, as illustrated in FIGS. 6A and 6B, if the user presses the firmware button 1201c to install the firmware having the function version of "FW V1.2," the UI unit 521 instructs the display unit 112 to display an installation screen 1300 used for installing the firmware having the function version of "FW V1.2."

As illustrated in FIG. 6B, the installation screen 1300 includes, for example, a screen shot display section 1301 used for indicating a state of the concerned firmware being operated, a description display section 1302 used for describing the operation of the concerned firmware, and a detail link section 1303 used for shifting (transition) to a screen displaying the details of the function of the concerned firmware.

For example, as illustrated in FIG. 6B, if the user touches the detail link section 1303, the UI unit 521 instructs the display unit 112 to display a detail screen 1400 used for displaying the function of the concerned firmware in detail. The detail screen 1400 is a screen used for displaying a detailed description of the newly added function for the firmware having the function version of "FW V1.2."

Hereinafter, a description is given of the installation screen 1300 in detail. It is assumed that a firmware having a function version of "V1.1" is installed on the MFP 10, and the function corresponding to the function version of "V1.1"

is activated. In this example case, the maximum function version becomes "V1.1," and the current function version also becomes "V1.1."

In this example case, if the firmware button 1201*c* used for installing the firmware having the function version of "FW V1.2" is pressed on the list screen 1200 (FIG. 6A), the installation screen 1300 of the firmware having the function version of "FW V1.2" is displayed as illustrated in FIG. 12.

As illustrated in FIG. 12, the installation screen 1300 includes, for example, the screen shot display section 1301, the description display section 1302, the detail link section 1303, an installation button 1304 used for performing an installation processing (or activation) processing, a charged/non-charged display section 1305 indicating whether the firmware is charged (charged firmware) or free of charge (non-charged firmware).

In an example case of FIG. 12, since the firmware having the function version of "FW V1.2" is a non-charged firmware, the charged/non-charged display section 1305 displays "non-charged." Then, if the user presses the installation button 1304, it becomes clear that the user wants to use the function corresponding to the function version of "V1.2," and then the firmware having the function version of "FW V1.2" is downloaded from the application market server 20 and installed, and then the function corresponding to the function version of "V1.2" is activated.

Further, if the firmware button 1201*d* on the list screen 1200 (FIG. 6A) is pressed to install the firmware having the function version of "FW V2.0," an installation screen 1310 of the firmware having the function version of "FW V2.0" is displayed as illustrated in FIG. 13.

As illustrated in FIG. 13, the installation screen 1310 includes, for example, a screen shot display section 1311, a description display section 1312, a detail link section 1313, an installation button 1314, and a charged/non-charged display section 1315. The functions of the screen shot display section 1311, the description display section 1312, and the detail link section 1313 are similar to the functions of the screen shot display section 1301, the description display section 1302, and the detail link section 1303 displayed on the above described installation screen 1300.

Since the firmware having the function version of "FW V2.0" is a charged firmware, the charged/non-charged display section 1315 displays "charged: xx $ per unit." Therefore, the user can recognize that the desired firmware is the charged firmware by checking the contents of the charged/non-charged display section 1315 of the installation screen 1310.

Then, if the user presses the installation button 1314, the MFP 10 transmits a firmware installation execution instruction of the concerned firmware to the application market server 20, and then the application market server 20 inquires the contract management server 30 whether or not the concerned firmware is already purchased. If the contract management server 30 determines that the concerned firmware is not yet purchased, the UI unit 521 displays, for example, a dialog box used for displaying a message indicating that the concerned firmware having the function version of "FW V2.0" cannot be installed because the concerned firmware having the function version of "FW V2.0" is not yet purchased.

On the other hand, if the contract management server 30 determines that the concerned firmware is already purchased, the concerned firmware having the function version of "FW V2.0" is downloaded from the application market server 20 and installed, and then the function corresponding to the function version of "V2.0" is activated.

Further, if the firmware button 1201*a* on the list screen 1200 is pressed to install the firmware having the function version of "FW V1.0," an installation screen 1320 of the firmware having the function version of "FW V1.0" is displayed as illustrated in FIG. 14.

As illustrated in FIG. 14, the installation screen 1320 includes, for example, a screen shot display section 1321, a description display section 1322, a detail link section 1323, an installed display section 1324, and a charged/non-charged display section 1325. The functions of the screen shot display section 1321, the description display section 1322, and the detail link section 1323 are similar to the functions of the screen shot display section 1301, the description display section 1302, and the detail link section 1303 displayed on the above described installation screen 1300.

In an example case of FIG. 14, since the firmware having the function version of "FW V1.0" is a non-charged firmware, the charged/non-charged display section 1325 displays "non-charged."

However, as described above, as to the state of the firmware of the MFP 10, the maximum function version is "V1.1" and the current function version is also "V1.1," and the function corresponding to the function version of "V1.0" is already activated, so that the firmware having the function version of "V1.0" is not required to be installed on the MFP 10. Therefore, instead of the installation buttons 1304 and 1314 illustrated in FIGS. 12 and 13, the installed display section 1324 displays "installed." Therefore, the user can recognize that the firmware selected on the list screen 1200 is already installed (or the function corresponding to the function version of the selected firmware is already activated).

Hereinafter, a description is given of a screen transition from the home screen 1000 to the installation screen 1300 with reference to FIGS. 7A and 7B, which is a different path compared to the screen transition illustrated in FIGS. 6A and 6B. The home screen 1000 illustrated in FIGS. 7A and 7B includes, for example, a widget 1003 instead of the banner display section 1001 included in the home screen 1000 illustrated in FIGS. 6A and 6B.

The widget 1003 is a display area and button used for displaying the latest information on the MFP 10. In an example case of FIGS. 7A and 7B, the widget 1003 displays a message indicating that the "latest information: received latest information of software update" to inform a user that the concerned software can be in a updatable state.

As illustrated in FIG. 8, the home screen 1000 includes, for example, the application site button 1002, the widget 1003, a copy button 1004*a* used for performing copy processing, a scan button 1004*b* used for performing scanning processing, and a facsimile button 1004*c* used for performing facsimile processing.

If the user presses the widget 1003, the UI unit 531 instructs the display unit 112 to display a notification dialog box 1500 (see FIG. 7B). Different from the banner detail dialog box 1100 above described in FIG. 6B, the notification dialog box 1500 is a screen used for displaying which specific firmware can be installed (or activated). As illustrated in FIG. 7B, the notification dialog box 1500 includes, for example, a screen shot display section 1501, a description display section 1502, and a detail button 1503. In an example case of FIG. 7B, the notification dialog box 1500 displays the firmware having the function version of "FW V1.2."

The screen shot display section 1501 is a display section used for displaying a state of the concerned firmware being operated, displayed by the notification dialog box 1500, as a screen shot.

The description display section 1502 is a display section used for describing the operation of the concerned firmware.

The detail button 1503 is a button used for displaying an installation screen used for performing an installation (activation) operation of the concerned firmware.

For example, as illustrated in FIGS. 7A and 7B, if the user presses the detail button 1503 to install the firmware having the function version of "FW V1.2," the UI unit 521 instructs the display unit 112 to display the installation screen 1300 used for installing the concerned firmware. The layout and function of the installation screen 1300 are described as above.

As described above, by pressing the widget 1003 displaying the latest information on the home screen 1000 of the MFP 10, for example, the notification dialog box 1500 notifying the installable (or activatable) firmware is displayed, with which the user can recognize and check the contents of the firmware, and can proceed to the installation operation easily.

(Operation of Increasing Current Function Version)

Figures 16, 17:
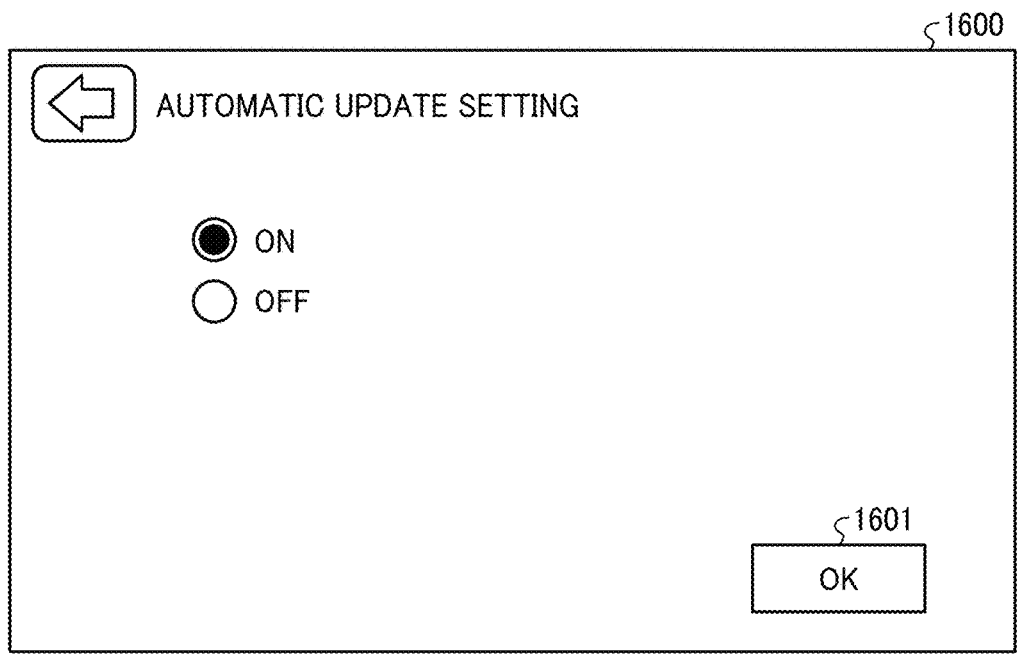
FIG. 16 illustrates an example case of using a charged function version.
FIG. 17 illustrates an example of automatic update setting screen.

FIG. 15 illustrates an operation of increasing a current function version. FIG. 16 illustrates an example case of using a charged function version. Hereinafter, a description is given of an operation of increasing the current function version with reference to FIGS. 15 and 16.

In an example case of FIG. 15, the maximum function version is "V1.2," and the current function version is "V1.1." In this example case, since the installed firmware has a potential for providing functions A, B, and C, the activation of function corresponding to the respective function versions of "V1.0," "V1.1," and "V1.2" can be performed without updating the firmware.

For example, if the current function version is to be increased from "V1.1" to "V1.2" (when to activate the function corresponding to the function version of "V1.2"), since the firmware having the function version of "V1.2" supports the function corresponding to the function version of "V1.2," the function corresponding to the function version of "V1.2" can be performed without updating the firmware. Specifically, when the firmware button 1201c used for installing the firmware having the function version of "FW V1.2" on the list screen 1200 (see FIG. 9) is pressed and then the installation screen 1300 (see FIG. 12) is displayed, the function corresponding to the function version of "V1.2" can be implemented by pressing the installation button 1304. In this example case, since the maximum function version is "V1.2" and the firmware having the function version of "V1.2" is already installed, without activating the firmware actually, the activation of the function corresponding to the function version of "V1.2" alone is performed.

On the other hand, if the current function version is increased from "V1.1" to "V1.3" (when to activate the function corresponding to the function version of "V1.3"), since the maximum function version is "V1.2" currently, the firmware is required to be updated to the firmware having the function version of "V1.3."

Specifically, if the firmware button used for installing the firmware having the function version of "FW V1.3" is pressed on the list screen 1200 and then the installation screen of the firmware having the function version of "FW V1.3" is displayed, the function corresponding to the function version of "V1.3" can be implemented by pressing the installation button 1304.

If the user presses the installation button, it becomes clear that the user wants to use the function corresponding to the function version of "V1.3," and then the firmware having the function version of "FW V1.3" is downloaded from the application market server 20 and installed, and the function corresponding to the function version of "V1.3" is activated. As a result, the maximum function version becomes "V1.3," and the current function version also becomes "V1.3."

In an example case of FIG. 16, the maximum function version is "V1.3," and the current function version is "V1.3." In this example case, when to update the firmware to a charged firmware having the function version of "V2.0," a user who has logged in the MFP 10 requires to make a purchase contract for purchasing the charged firmware having the function version of "V2.0 with the contract management server 30.

In this example case, if the user presses the installation button 1314 on the installation screen 1310 of the concerned firmware having the function version of "FW V2.0" (see FIG. 13), the MFP 10 transmits a firmware installation execution instruction of the concerned firmware to the application market server 20, and then the application market server 20 inquires the contract management server 30 whether or not the concerned firmware is already purchased.

If the contract management server 30 determines that the firmware is not yet purchased, the UI unit 521 displays, for example, a dialog box used for displaying a message indicating that the concerned firmware having the function version of "FW V2.0" cannot be installed because the concerned firmware having the function version of "FW V2.0" is not yet purchased.

On the other hand, if the contract management server 30 determines that the concerned firmware is already purchased, the concerned firmware having the function version of "FW V2.0" is downloaded from the application market server 20 and installed, and then the function corresponding to the function version of "V2.0" is activated.

As to the above described example case of FIG. 10, the function version is increased every time the function is added, but the function version is not necessarily increased when adding the function. For example, the function version may be increased when improving functionality, such as correcting bug. When the firmware, which has upgraded the function version for improving functionality, such as correcting bug, is to be installed and activated, the firmware can be automatically installed and activated without performing the screen transition illustrated in FIGS. 6 and 7 for performing the installation and activation of the firmware. However, since the control or management of the function version before and after improving the functionality, such as correcting bug, is required, for example, the maximum function version and the firmware version are managed using, for example, the following Table 2.

TABLE 2

| Firmware version | V1.0.0 | V1.0.1 | V1.1.0 | V1.1.1 | ... V2.0.0 |
|---|---|---|---|---|---|
| Maximum function version | V1.0 | V1.0 | V1.1 | V1.1 | ... V2.0 |

In Table 2, for example, as to the firmware version of "V1.0.1," the most-left side "1" of "V1.0.1" is referred to as a major version, the center "0" of "V1.0.1" is referred to as a minor version, and the most-right side "1" of "V1.0.1" is referred to as a maintenance version. In this example case, the version associated with the adding function is to be changed by increasing the minor version or the major version.

On the other hand, the version associated with improving functionality, such as correcting bug, is to be changed by increasing the maintenance version. For example, if the firmware version is changed from "V1.0.0" to "V1.0.1, it can be recognized that the version is changed for improving functionality, such as correcting, bug because the maintenance version is increased. However, even if the version is upgraded from "V1.0.0" to "V1.0.1," the function version remains to be "V1.0" without the change.

(Automatic Update Setting and Automatic Activation Setting)

Figure 18:
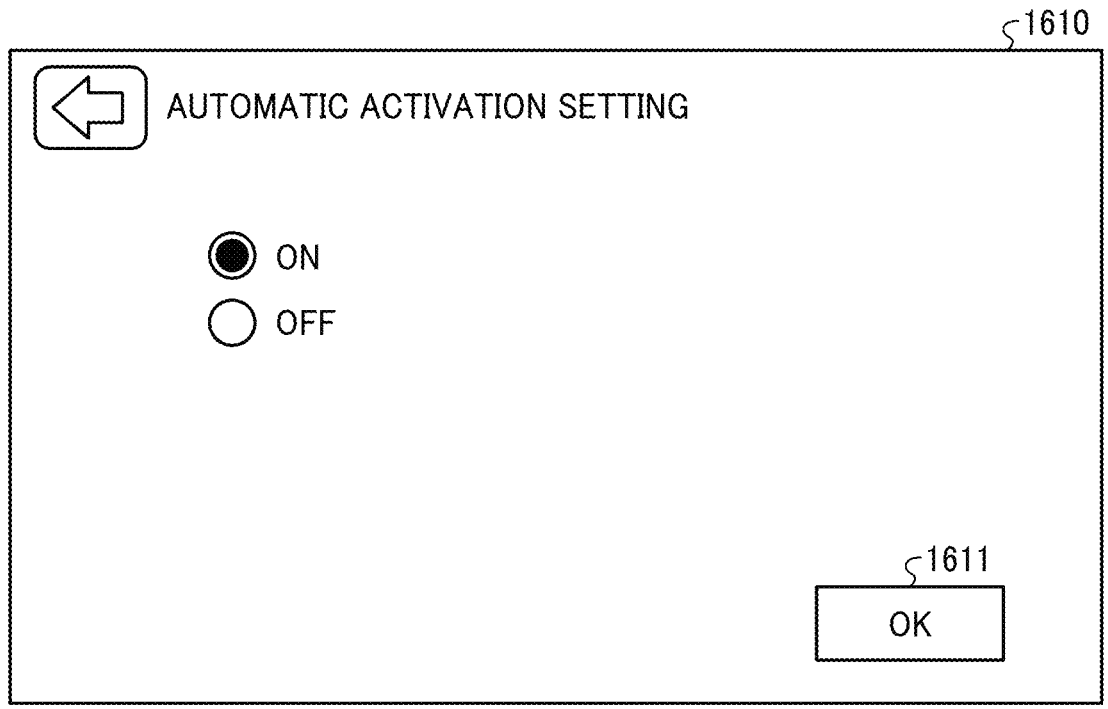
FIG. 18 illustrates an example of automatic activation setting screen.

FIG. 17 illustrates an example of automatic update setting screen. FIG. 18 illustrates an example of automatic activation setting screen. Hereinafter, a description is given of an automatic update setting of firmware and an automatic activation setting of function of firmware with reference to FIGS. 17 and 18.

If a user presses the management button 1203 on the list screen 1200 (see FIG. 9), the UI unit 531 instructs the display unit 112 to display an automatic update setting screen 1600 illustrated in FIG. 17 or an automatic activation setting screen 1610 illustrated in FIG. 18.

Further, the list screen 1200 may include a management button used for displaying the automatic update setting screen 1600 and a management button used for displaying for the automatic activation setting screen 1610.

Further, the automatic update setting screen 1600 or the automatic activation setting screen 1610 may be displayed when the management button 1203 is pressed, and then the automatic update setting screen 1600 and the automatic activation setting screen 1610 may be freely shifted therebetween.

The automatic update setting screen 1600 (FIG. 17) is used as a screen to set whether the MFP 10 automatically downloads and installs (updates), from the application market server 20, a firmware, which is upgraded from the firmware currently installed on the MFP 10, is released from the application market server 20. After a user sets ON/OFF on the automatic update setting screen 1600 and presses OK button 1601, the setting unit 532 stores the concerned setting information in the storage unit 114.

For example, if the automatic update setting of the firmware is turned "on" on the automatic update setting screen 1600, and then the installation request unit 524 of the MFP 10 receives a notice of releasing of the version-upgraded firmware from the application market server 20 via the communication unit 113, the installation request unit 524 automatically transmits an installation request of the version-upgraded firmware to the application market server 20. Then, the update unit 612 automatically downloads the version-upgraded firmware from the application market server 20 via the communication unit 113, and updates and stores the version-upgraded firmware in the non-operation region of the ROM 822.

The automatic activation setting screen 1610 (FIG. 18) is used as a screen to set whether all of functions of the version-upgraded firmware are to be automatically activated when the version-upgraded firmware is installed on the MFP 10. After a user sets ON/OFF on the automatic activation setting screen 1610 and presses OK button 1611, the setting unit 532 stores the concerned setting information in the storage unit 114.

For example, in one case, if the automatic activation setting is turned "off" on the automatic activation setting screen 1610 and the automatic update setting is turned "on" on the automatic update setting screen 1600, and then the installation button on the installation screen is pressed, if the concerned firmware displayed on the installation screen is already automatically downloaded and updated, the second activation processing unit 614 performs the activation process of the function of the concerned firmware alone.

Further, in another case, if the automatic activation setting is turned "on" on the automatic activation setting screen 1610 and the automatic update setting is turned "on" on the automatic update setting screen 1600, the installation request unit 524 automatically transmits an installation request of the firmware, the update unit 612 automatically downloads the concerned firmware and updates the concerned firmware in the non-operation region of the ROM 822, and then the second activation processing unit 614 automatically performs the activation process of the function of the concerned firmware.

(Purchase of Firmware)

Figure 19:
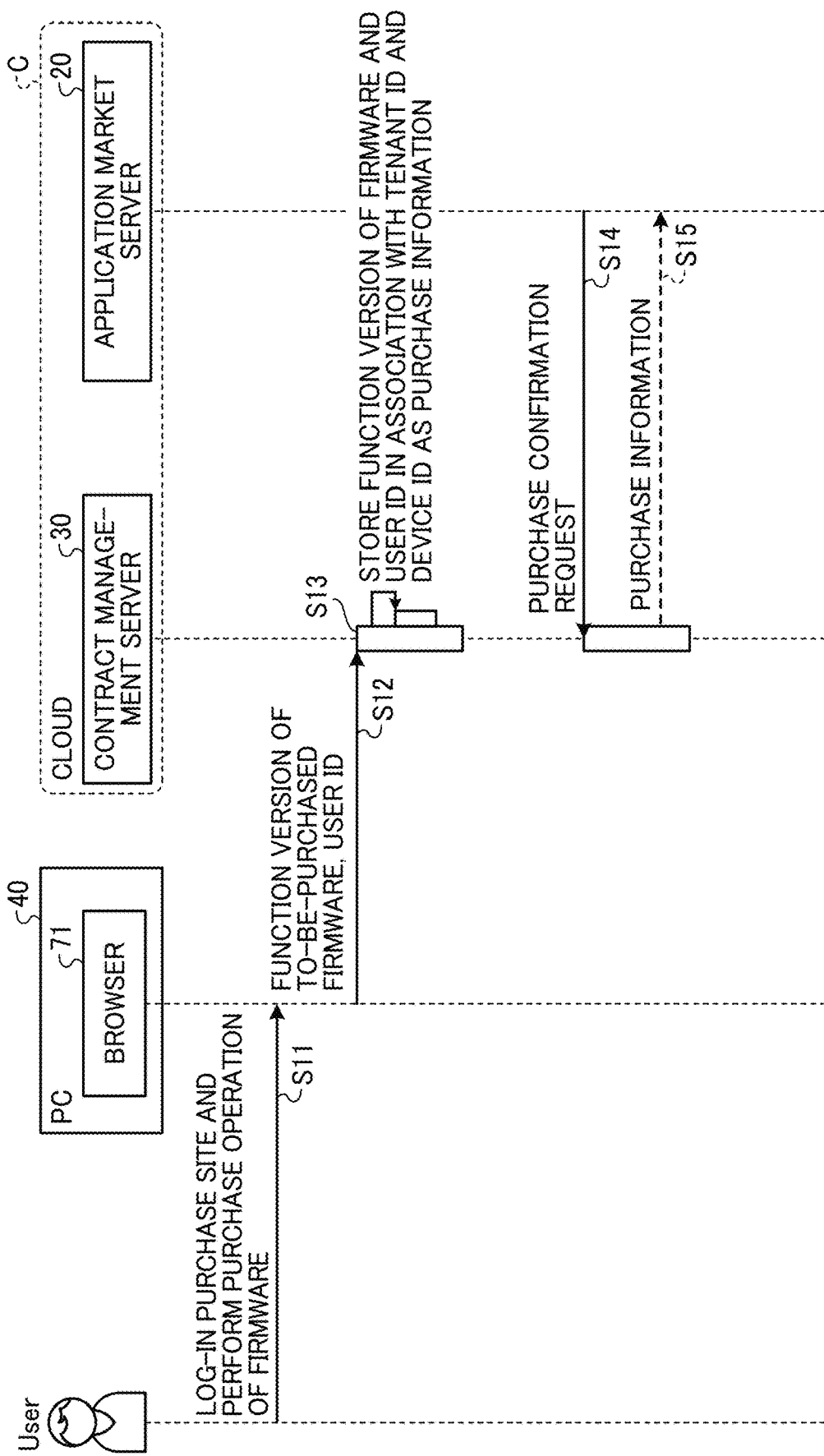
FIG. 19 is an example of sequence diagram of operation of purchasing a firmware.

FIG. 19 is an example of sequence diagram of operation of purchasing a firmware. Hereinafter, a description is given of a flow of firmware purchase operation in the information processing system 1 with reference to FIG. 19.

(Step S11) A user logs in a purchase site of the contract management server 30, sees the purchase site being displayed using the browser 71 of the PC 40, and performs a purchase operation of a firmware via the input unit 401 of the PC 40 to select a desired firmware.

(Step S12) Then, the purchase request unit 711 of the browser 71 of the PC 40 transmits, to the contract management server 30 via the communication unit 402, a function version of the firmware selected as a purchase target via the input unit 401 (or version of firmware) (for the simplicity of description, function version is described hereinafter), and user identification (ID) of the user.

(Step S13) In response to receiving the function version of firmware and the user ID from the PC 40, the purchase information registration unit 301 of the contract management server 30 stores or registers the function version of the selected firmware and the user ID in the storage unit 304 as the purchase information in association with tenant ID and device ID.

(Steps S14, S15) When the purchase information response unit 302 of the contract management server 30 receives, from the purchase confirmation request unit 203 of the application market server 20, a purchase confirmation request for checking whether the designated or selected firmware is already purchased, the purchase information response unit 302 transmits the purchase information on the concerned firmware to the application market server 20 via the communication unit 303 as a response to the purchase confirmation request.

By performing the sequence of steps S11 to S15, the firmware purchase operation is performed.

(Installation and Activation of Firmware in Information Processing System)

Figure 20:
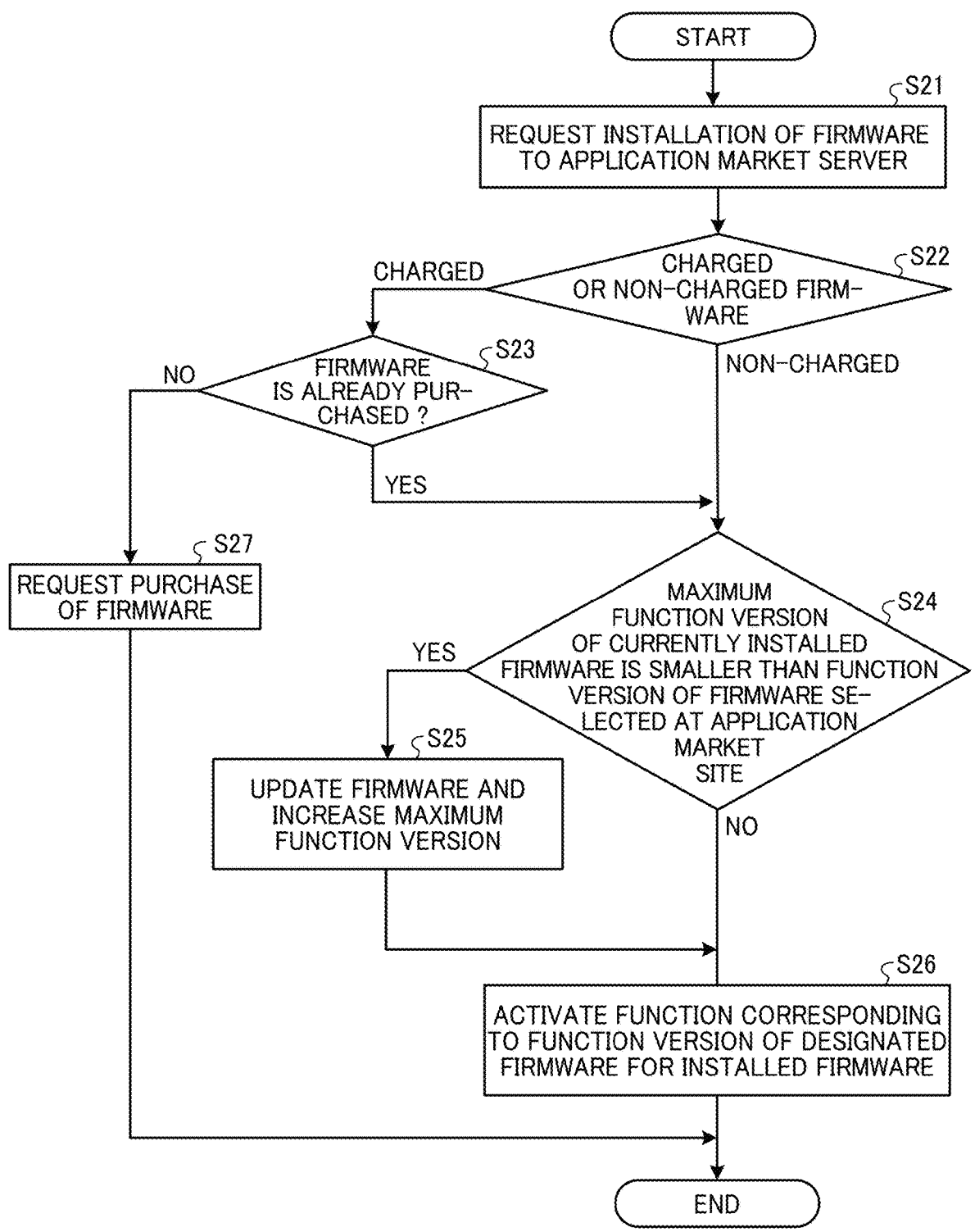
FIG. 20 is an example of sequence diagram of operation when to install a firmware.

FIG. 20 is an example of sequence diagram of operation when to install a firmware. Hereinafter, a description is given of an operation of firmware installation and firmware activation in the information processing system 1 with reference to FIG. 20.

(Step S21) A user uses the MFP 10 to display an installation screen of desired firmware that is requited for installation and activation, and then presses an installation button on the installation screen via the input unit 111 to perform the installation of the designated desired firmware. Then, the installation request unit 524 of the MFP 10 transmits, to the application market server 20 via the communication unit 113, an installation execution instruction requesting an installation of the designated firmware. Then, the sequence proceeds to step S22.

(Step S22) If the designated firmware, a target of installation execution instruction, is a charged firmware (step S22: charged), the sequence proceeds to step S23. If the designated firmware, the target of installation execution instruction, is a non-charged firmware (step S22: non-charged), the sequence proceeds to step S24.

(Step S23) If the designated firmware, the target of installation execution instruction, is the charged firmware, and the purchase confirmation request unit 203 of the application market server 20 receives an installation execution instruction from the installation request unit 524 of the MFP 10, the purchase confirmation request unit 203 of the application market server 20 transmits, to the contract management server 30 via the communication unit 205, a purchase confirmation request to check or confirm whether the designated firmware is already purchased or not. Then, in response to receiving the purchase confirmation request from the application market server 20, the purchase information response unit 302 of the contract management server 30 refers to the storage unit 304, and transmits specific purchase information corresponding to the designated firmware indicated by the purchase confirmation request to the application market server 20 via the communication unit 303.

If the purchase information indicates that the designated firmware is already purchased (step S23: YES), the sequence proceeds to step S24. If the purchase information indicates that the designated firmware is not yet purchased (step S23: NO), the sequence proceeds to step S27.

(Step S24) Then, the determination unit 615 of the MFP 10 determines whether the maximum function version of the currently-installed firmware is smaller than the function version of the firmware selected or designated at the application market site (hereinafter, may be also referred to as "designated function version"). If the maximum function version of the currently-installed firmware is smaller than the designated function version (step S24: YES), the sequence proceeds to step S25. If the maximum function version of the currently-installed firmware is equal to or greater than the designated function version (step S24: NO), the sequence proceeds to step S26.

(Step S25) Then, the update unit 612 of the MFP 10 downloads the designated firmware selected at the application market site from the application market server 20 via the communication unit 113, and updates and stores the designated firmware in the non-operation region of the ROM 822. If necessary, the MFP 10 is rebooted, and then the first activation processing unit 613 of the MFP 10 copies the designated firmware, updated in the non-operation region of the ROM 822 by the update unit 612, to the in-operation region of the ROM 822, and executes the designated firmware. With this processing, the maximum function version is increased. Then, the sequence proceeds to step S26.

(Step S26) Then, the second activation processing unit 614 of the MFP 10 activates the function corresponding to the function version of the designated firmware for the currently-installed firmware. With this processing, the current function version can be increased to the designated function version. Then, the operation of firmware installation and firmware activation is completed.

(Step S27) If the purchase information is transmitted from the contract management server 30 to the application market server 20, and the purchase information indicates that the designated firmware is not yet purchased (step S23: NO), the purchase confirmation request unit 203 transmits, to the MFP 10 via the communication unit 205, information indicating that the designated firmware cannot be installed because the designated firmware is not yet purchased.

In response to receiving the information indicating that the designated firmware cannot be installed because the designated firmware is not yet purchased from the application market server 20, the UI unit 521 of the MFP 10 instructs the display unit 112 to display a message indicating that the designated firmware cannot be installed because the designated firmware is not yet purchased, and a message of requesting a purchase of the designated firmware.

By performing the sequence of steps S21 to S27, the operation of firmware installation and firmware activation is performed.

Figure 21:
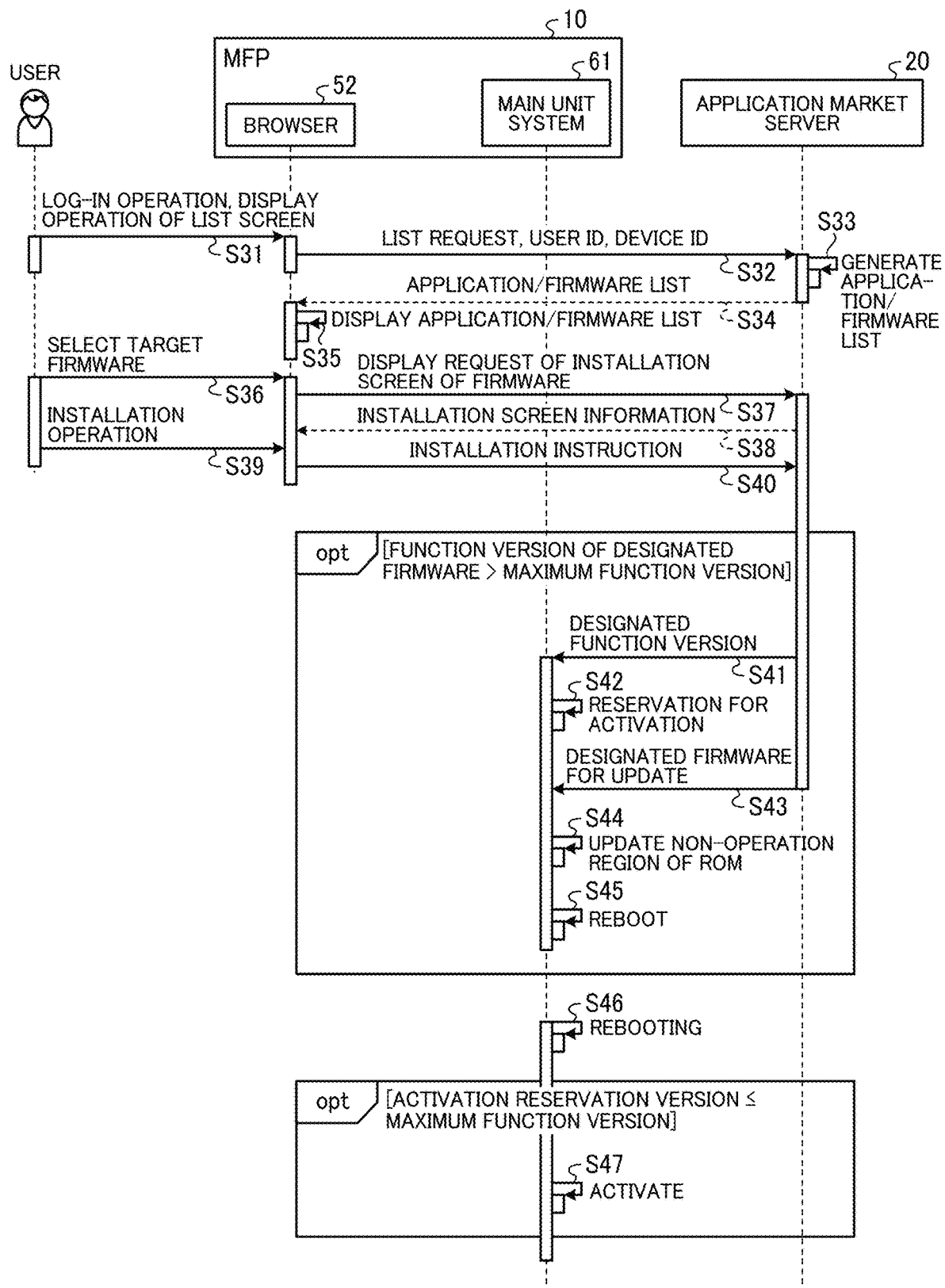
FIG. 21 is an example of sequence diagram illustrating an operation of installing a firmware when an automatic update setting is turned "off" and an automatic activation setting is turned "off"

FIG. 21 is an example of sequence diagram illustrating an operation of installing a firmware when the automatic update setting is turned "off" and the automatic activation setting is turned "off." Hereinafter, a description is given of a detailed description of a flow of operation of firmware installation and firmware activation when the automatic update setting is turned "off" and the automatic activation setting is turned "off" in the information processing system 1 with reference to FIG. 21. Further, it is assumed that the firmware to be selected or designated in FIG. 21 is a non-charged firmware.

(Steps S31, S32) A user uses the input unit 111 of the MFP 10 to perform a log-in operation to the application market site of the application market server 20 to display the list screen 1200 on the MFP 10. Then, the list request unit 522 of the MFP 10 transmits, to the application market server 20, a list request requesting a list of application and firmware that can be installed on the MFP 10, the user ID of the log-in user, and the device ID of the MFP 10.

(Steps S33, S34, S35) In response to receiving the list request from the MFP 10, the list response unit 201 of the application market server 20 generates a list of application and firmware (hereinafter, application/firmware list) that can be installed on the MFP 10, and transmits the application/firmware list to the MFP 10 via the communication unit 205. Then, the UI unit 521 of the MFP 10 instructs the display unit 112 to display the list screen 1200 displaying the application/firmware list received from the application market server 20.

(Steps S36, S37) If the user selects a firmware button of a target firmware that is desired by the user to be installed and activated, on the list screen 1200 using the input unit 111, the screen request unit 523 of the MFP 10 transmits, to the application market server 20 via the communication unit 113, a display request of an installation screen of the selected or designated firmware.

(Step S38) In response to receiving the display request of the installation screen of the selected or designated firmware from the MFP 10, the screen response unit 202 of the application market server 20 transmits information of installation screen information (hereinafter, installation screen information) of the designated firmware to the MFP 10 via the communication unit 205. Then, the UI unit 521 of the MFP 10 instructs the display unit 112 to display the installation screen of the designated firmware based on the installation screen information received from the application market server 20.

(Steps S39, S40) If the user presses the installation button on the installation screen using the input unit 111, the installation request unit 524 of the MFP 10 transmits an installation execution instruction requesting the installation of the designated firmware to the application market server 20 via the communication unit 113. With this configuration, by pressing the installation button on the installation screen, it becomes clear that the user wants to use the function corresponding to the function version of the firmware selected by the user.

(Steps S41, S42, S43, S44) Then, the determination unit 615 of the MFP 10 compares the function version of the designated firmware and the maximum function version of the currently-installed firmware to determine which function version is greater. In this example case, it is assumed that the determination unit 615 determines that the function version of the designated firmware is greater than the maximum function version of the currently-installed firmware (function version of designated firmware>maximum function version). In this example case, the currently-installed firmware cannot support the function corresponding to the function version of the designated firmware, and thereby the uploading of the designated firmware is required.

In response to receiving the installation execution instruction from the installation request unit 524, the designated version response unit 204 of the application market server 20 transmits the function version of the designated firmware to the MFP 10 via the communication unit 205.

Then, as to the function version of the firmware selected or designated by the user, the reservation unit 611 of the MFP 10 makes a reservation for enabling the function corresponding to the function version after updating the firmware selected or designated by the user. The information of the function corresponding to the function version that is reserved by the reservation unit 611 is temporarily stored, for example, in the RAM 823 or the storage 824 illustrated in FIG. 2. Then, the update unit 612 of the MFP 10 downloads the designated firmware from the application market server 20 via the communication unit 113, and updates and stores the designated firmware in the non-operation region of the ROM 822.

(Steps S45, S46) After the update unit 46 has updated the designated firmware in the non-operation region, the first activation processing unit 613 of the MFP 10 reboots the MFP 10. Then, in response to rebooting the MFP 10, the first activation processing unit 613 copies the designated firmware, updated in the non-operation region of the ROM 822 by the update unit 612, to the in-operation region of the ROM 822 and executes the designated firmware.

(Step S47) Then, the determination unit 615 of the MFP 10 determines whether the function version reserved by the reservation unit 611 (activation reservation version) is equal to or less than the maximum function version of the currently-installed firmware. If the activation reservation version is equal to or less than the maximum function version of the currently-installed firmware (activation reservation version≤maximum function version), the second activation processing unit 614 of the MFP 10 activates the function corresponding to the function version of the firmware designated by the user for the firmware installed on the ROM 822, such as the firmware that is copied to the in-operation region and executed. With this configuration, the firmware that the user wants to use can be installed, and the function of the desired firmware is enabled and usable.

By performing the sequence of steps S41 to S47, the operation of firmware installation and firmware activation is performed when the automatic update setting is turned "off" and the automatic activation setting is turned "off."

Figure 22:
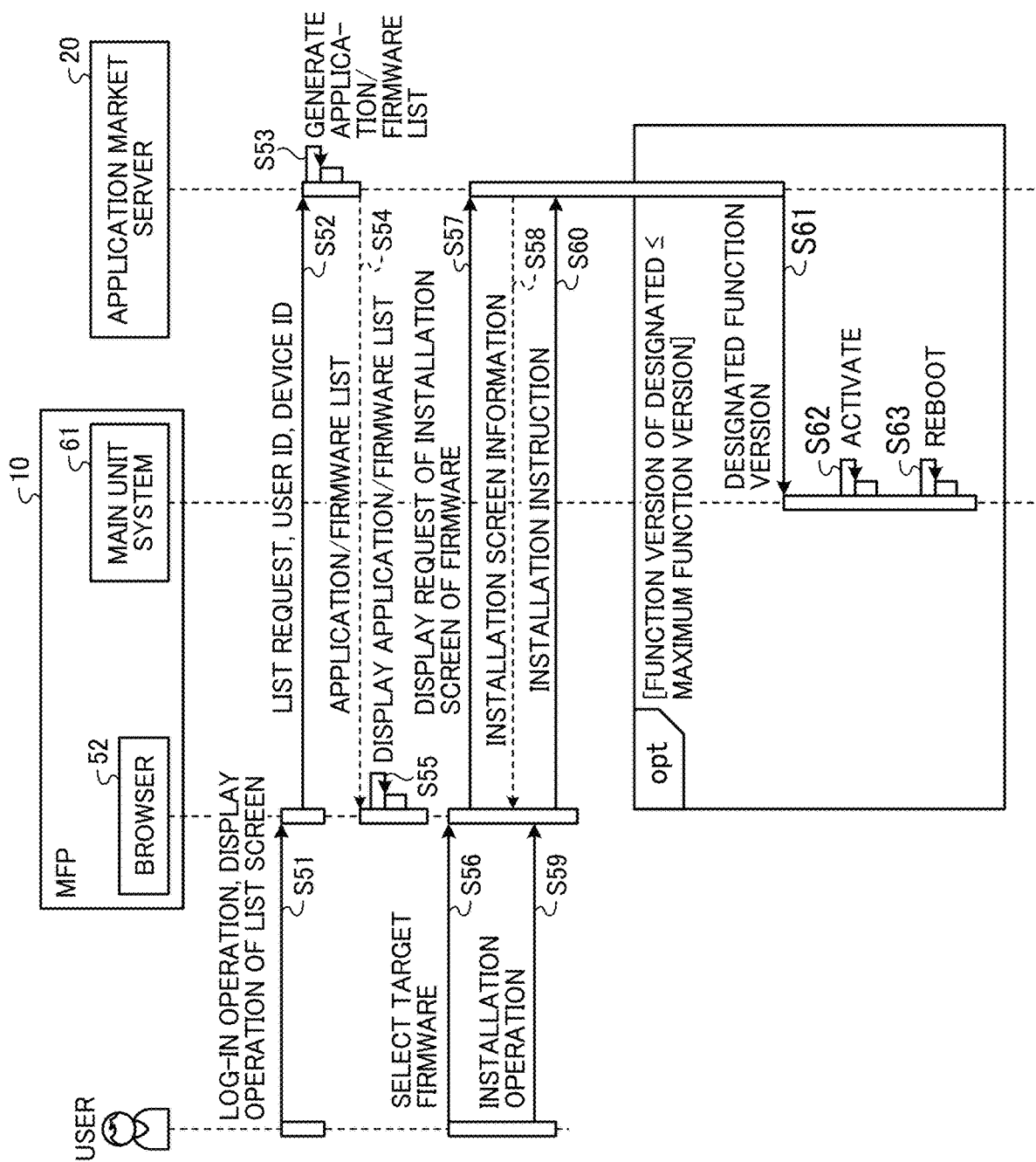
FIG. 22 is an example of sequence diagram illustrating an operation of installing a firmware when an automatic update setting is turned "on" and an automatic activation setting is turned "off"

FIG. 22 is an example of sequence diagram illustrating an operation of installing a firmware when the automatic update setting is turned "on" and the automatic activation setting is turned "off." Hereinafter, a description is given of a detailed description of a flow of operation of firmware installation and firmware activation when the automatic update setting is turned "on" and the automatic activation setting is turned "off" in the information processing system 1 with reference to FIG. 22. Therefore, when the sequence diagram illustrated in FIG. 22 is started, it is assumed that the latest firmware is updated. Further, it is assumed that the firmware to be selected or designated in FIG. 22 is a non-charged firmware.

(Steps S51, S52) A user uses the input unit 111 of the MFP 10 to perform a log-in operation to the application market site of the application market server 20 to display the list screen 1200 on the MFP 10. Then, the list request unit 522 of the MFP 10 transmits, to the application market server 20, a list request requesting a list of application and firmware that can be installed on the MFP 10, the user ID of the log-in user, and the device ID of the MFP 10.

(Steps S53, S54, S55) In response to receiving the list request from the MFP 10, the list response unit 201 of the application market server 20 generates a list of application and firmware (hereinafter, application/firmware list) that can be installed on the MFP 10, and transmits the application/firmware list to the MFP 10 via the communication unit 205. Then, the UI unit 521 of the MFP 10 instructs the display unit 112 to display the list screen 1200 displaying the application/firmware list received from the application market server 20.

(Steps S56, S57) If the user selects a firmware button of a target firmware that is desired by the user to be installed and activated, on the list screen 1200 using the input unit 111, the screen request unit 523 of the MFP 10 transmits, to the application market server 20 via the communication unit 113, a display request of an installation screen of the selected or designated firmware.

(Step S58) In response to receiving the display request of the installation screen of the selected or designated firmware from the MFP 10, the screen response unit 202 of the application market server 20 transmits information of installation screen (hereinafter, installation screen information) of the designated firmware to the MFP 10 via the communication unit 205. Then, the UI unit 521 of the MFP 10 instructs the display unit 112 to display the installation screen of the designated firmware based on the installation screen information received from the application market server 20.

(Steps S59, S60) If the user presses the installation button on the installation screen using the input unit 111, the installation request unit 524 of the MFP 10 transmits an installation execution instruction requesting the installation of the designated firmware to the application market server 20 via the communication unit 113. With this configuration, by pressing the installation button on the installation screen, it becomes clear that the user wants to use the function corresponding to the function version of the firmware selected by the user.

(Steps S61, S62, S63) Then, the determination unit 615 of the MFP 10 compares the function version of the designated firmware and the maximum function version of the currently-installed firmware to determine which function version is greater. In this example case, it is assumed that the function version of the designated firmware is equal to smaller than the maximum function version of the currently-installed firmware (function version of designated firmware≤maximum function version). In this example case, the currently-installed firmware can support the function corresponding to the function version of the designated firmware, and thereby the uploading of the designated firmware is not required.

In response to receiving the installation execution instruction from the installation request unit 524, the designated version response unit 204 of the application market server 20 transmits the function version of the designated firmware to the MFP 10 via the communication unit 205. Then, the second activation processing unit 614 of the MFP 10 activates the function corresponding to the function version of the firmware designated by the user for the firmware installed on the ROM 822, such as the firmware that is copied to the in-operation region and executed. With this configuration, the function of the firmware that the user wants to use is enabled and usable. Then, the first activation processing unit 613 reboots the MFP 10 as needed.

By performing the sequence of steps S51 to S63, the operation of firmware installation and firmware activation is performed when the automatic update setting is turned "on" and the automatic activation setting is turned "off."

Figure 23:
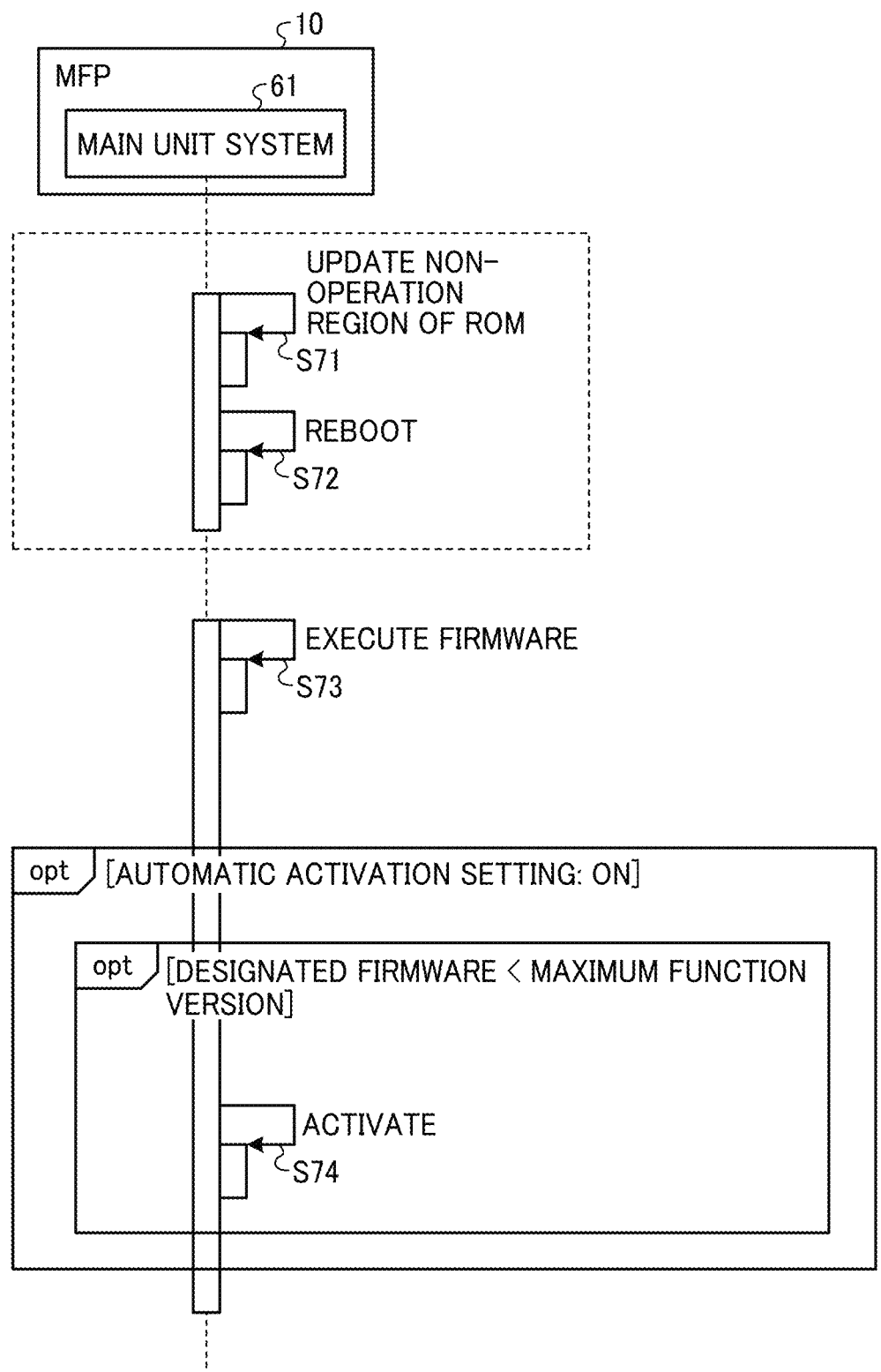
FIG. 23 is an example of sequence diagram illustrating an operation when an automatic activation setting is turned "on."

FIG. 23 is an example of sequence diagram of operation when the automatic activation setting is turned "on." Hereinafter, a description is given of a flow of firmware installation and firmware activation when the automatic activation setting is turned "on" in the information processing system 1 with reference to FIG. 23. Further, it is assumed that the firmware to be selected or designated in FIG. 23 is a non-charged firmware.

(Steps S71, S72) The update unit 612 of the MFP 10 downloads the designated firmware from the application market server 20 via the communication unit 113, and updates the designated firmware in the non-operation region of the ROM 822. Then, after the update unit 612 updates the designated firmware in the non-operation region, the first activation processing unit 613 of the MFP 10 reboots the MFP 10. The operations performed by the update unit 612 and the first activation processing unit 613 can be performed automatically when the automatic update setting is turned "on," or the operations performed by the update unit 612 and the first activation processing unit 613 can be performed at a time when a user presses the installation button on the install screen if the automatic update setting is turned "off."

(Step S73) Then, in response to rebooting the MFP 10, the first activation processing unit 613 copies the designated firmware, updated in the non-operation region of the ROM 822 by the update unit 612, to the in-operation region of the ROM 822, and executes the designated firmware.

(Step S74) Then, the determination unit 615 of the MFP 10 compares the function version of the designated firmware and the maximum function version of the currently-installed firmware to determine which function version is greater. In this example case, it is assumed that the function version of the designated firmware is smaller than the maximum function version (function version of designated firmware<maximum function version). If the function version of the designated firmware (activation reservation version) is smaller than the maximum function version of the currently-installed firmware, the second activation processing unit 614 of the MFP 10 activates the function corresponding to the function version of the firmware designated by the user for the firmware installed on the ROM 822, such as the firmware that is copied to the in-operation region and executed. With this configuration, the firmware that the user wants to use can be installed, and the function of the desired firmware is automatically enabled and useable.

By performing the sequence of steps S71 to S74, the operation of firmware installation and firmware activation is performed when the automatic activation setting is turned "on."

As to the above described information processing system 1, the electronic apparatus (e.g., MFP 10), used by the user, displays the list of firmware, which can be installed on the electronic apparatus, to the user. When the user selects the desired firmware from the list of firmware and performs the installation operation, the desired firmware is installed and activated.

Further, the firmware of the same series can be selected for each function version. For example, if the function version of the designated firmware is greater than the maximum function version of the currently-installed firmware, the designated firmware is downloaded and updated, and then the function of the designated firmware is activated. On the other hand, if the function version of the designated firmware is equal to or less than the maximum function version of the currently-installed firmware, without updating the firmware, the function of the desired function version can be used by performing the activation processing alone. Therefore, the updating of firmware of the electronic apparatus can be performed flexibly.

Further, as to the above described information processing system 1, the automatic update setting and the automatic activation setting can be used. For example, the firmware can be automatically updated corresponding to a usage style desired by a user, and further when the firmware is updated, the function of the updated firmware can be automatically activated, with which user convenience can be improved.

Further, as to the above described information processing system 1, if the target firmware is a charged firmware, it is configured to inquire the contract management server 30 whether or not the target firmware is already purchased. If the target firmware is already purchased, the target firmware is installed and activated, and if the target firmware is not yet purchased, the user is notified that the target firmware is not yet purchased. With this configuration, any types of firmware, such as the charged firmware and the non-charged firmware, can be installed and activated by performing the similar operational sequence, with which the updating of firmware of the electronic apparatus can be performed easily.

As to the above described embodiments of the electronic apparatus, information processing system, and information processing method, the updating of firmware of electronic apparatuses can be performed flexibly.

Each of the functions of the above-described embodiments can be implemented by one or more processing circuits or circuitry. The processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

In the above-described embodiment, when at least any of functional units of the MFP 10, the application market server 20, the contract management server 30 and the PC 40 are implemented by executing one or more programs, the programs are provided in advance by storing the programs in ROM or the like. The programs executed by the MFP 10, the application market server 20, the contract management server 30 and the PC 40 according to the above-described embodiment may be configured to be recorded on a computer-readable recoding medium, such as compact disk read only memory (CD-ROM), flexible disk (FD), compact disk-recordable (CD-R), digital versatile disc (DVD) or secure digital (SD) card, as files in an installable format or executable format.

Further, the programs executed by the MFP 10, the application market server 20, the contract management server 30 and the PC 40 according to the above-described embodiment may be configured to be provided on a computer connected to a network such as the Internet and downloaded via the network.

Further, the programs executed by the MFP 10, the application market server 20, the contract management server 30 and the PC 40 according to the above-described embodiment may be configured to be provided or distributed over a network such as the Internet.

Further, the programs executed by the MFP 10, the application market server 20, the contract management server 30 and the PC 40 according to the above-described embodiment implement one or more modules including at least any of the functional units described above, and as the actual hardware configuration, the CPU reads and executes the programs from the above-described storage device or apparatus to load and implement the above-described functional units on the main storage device.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. An electronic apparatus, comprising:
    circuitry configured to:
        download a plurality of programs via a network, each program of the plurality of programs being either an application or a firmware;
        install each program of the plurality of programs on the electronic apparatus by a booting process or a rebooting process;
        display, on a display, a list screen displaying a list of programs, wherein the list of programs includes programs of the plurality of programs, an installed firmware included in the list of programs is a version of a plurality of versions of firmware, and any installed firmware included in the list of programs is activated by a user selection and is not activated automatically;
        activate a program of the list of programs based on selection via the list screen by a user; and
        automatically activate another firmware that has been installed on the electronic apparatus and excluded from the list of programs.

2. The electronic apparatus of claim 1, wherein the program is included in the list, and the program includes one or more charged programs.

3. The electronics of claim 1, wherein the another firmware includes one or more firmware programs used for correcting functionality.

4. The electronic apparatus of claim 1, wherein the circuitry is further configured to
    set whether to download and update a firmware program having an upgraded function version automatically when the firmware program having the upgraded function version is released from a first server;
    when the firmware program having the upgraded function version is released from the first server, automatically download the firmware program having the upgraded function version from the first server, and update the firmware program having the upgraded function version in a memory;
    when the firmware program having the upgraded function version, updated in the memory, is included in the list, in response to a designation operation, activate functionality of the firmware program having the upgraded function version designated by the designation operation; and
    when the firmware program having the upgraded function version, updated in the memory, is not included in the list, activate the function of the firmware program having the upgraded function version after updating the firmware program having the upgraded function version.

5. The electronic apparatus of claim 1, wherein the circuitry is further configured to
    in response to a designation operation of a firmware program, compare a function version of a designated firmware program and a maximum function version of current firmware program, which is currently installed on the electronic apparatus, wherein the maximum function version of the current firmware program corresponds to a maximum range of functionality when all of functions of the current firmware program are activated, to determine which firmware program has a greater function version; and
    when a firmware program is designated by performing a designation operation, and then the circuitry determines that the function version of the designated firmware program is greater than the maximum function version of the current firmware program, download the designated firmware program from a first server, and update the designated firmware program in a memory, and then activate functionality of the designated firmware program updated in the memory.

6. The electronic apparatus of claim 5, wherein when the firmware program is designated by performing a designation operation, and then the circuitry determines that the function version of the designated firmware program is equal to or less than the maximum function version of the current firmware program, among entire functionality of the current firmware program being installed on the electronic apparatus, the circuitry updates one or more functions corresponding to the function version of the designated firmware program within the entire functionality of the current firmware program.

7. The electronic apparatus of claim 5, wherein the circuitry is further configured to
set whether to download and update a firmware program having an upgraded function version automatically when the firmware program having the upgraded function version is released from the first server in response to an operation; and
when the circuitry sets to automatically download and update the firmware program having the upgraded function version, and then the firmware program having the upgraded function version is released from the first server, automatically download the firmware program having the upgraded function version from the first server, and updates the firmware program having the upgraded function version in the memory.

8. The electronic apparatus of claim 7, wherein the circuitry is further configured to
set whether to activate entire functionality of the firmware program automatically when the firmware program having the function version that is upgraded is installed on the electronic apparatus in response to the operation; and
when the circuitry sets to activate the entire functionality of the firmware program automatically at a time when the firmware program having the upgraded function version is installed on the electronic apparatus, automatically activate the entire functionality of the firmware program having the upgraded function version when the firmware program having the upgraded function version is installed on the electronic apparatus.

9. The electronic apparatus of claim 5, wherein the circuitry is further configured to, when a firmware program used for correcting functionality and having a function version that is upgraded is released from the first server, automatically download the firmware program used for correcting functionality from the first server, and updates the firmware program used for correcting functionality in the memory.

10. The electronic apparatus of claim 4, wherein the circuitry is further configured to
store the firmware program downloaded from the first server in a non-operation region of the memory; and
when the electronic apparatus is activated or rebooted, transfer the firmware program stored in the non-operation region to an in-operation region of the memory, and execute the firmware program stored in the in-operation region.

11. The electronic apparatus of claim 4, wherein when the list, displayed on the display, includes a charged firmware program, the circuitry downloads the charged firmware program and updates the charged firmware program in the memory in a case that the electronic apparatus has already made a purchase contract for purchasing the charged firmware program with a second server that manages one or more purchase contracts of the charged firmware program.

12. The electronic apparatus of claim 11, wherein the charged firmware program is purchasable by accessing the second server from an information processing apparatus, which is different from the electronic apparatus.

13. The electronic apparatus of claim 1, wherein the another firmware includes a plurality of firmware programs installable on the electronic apparatus, and one or more packages, each combining any of a plurality of application programs and any of a plurality of firmware programs installable on the electronic apparatus.

14. An information processing system, comprising:
a server; and
an electronic apparatus connectable with the server via a network, wherein
the server is configured to manage a plurality of programs, the server including a memory configured to store the plurality of programs, and
the electronic apparatus includes circuitry configured to
download the plurality of programs from the server via the network, wherein each program of the plurality of programs being either an application or a firmware;
install each program of the plurality of programs on the electronic apparatus by a booting process or a rebooting process;
display, on a display, a list screen displaying a list of programs, wherein the list of programs includes programs of the plurality of programs, an installed firmware included in the list of programs is a version of a plurality of versions of firmware, and any installed firmware included in the list of programs is activated by a user selection and is not activated automatically;
activate a program of the list of programs based on selection via the list screen by a user; and
automatically activate another firmware that has been installed on the electronic apparatus and excluded from the list of programs.

15. A method for an electronic apparatus, the method comprising:
downloading a plurality of programs via a network, each program of the plurality of programs being either an application or a firmware;
installing each program of the plurality of programs on the electronic apparatus by a booting process or a rebooting process;
displaying, on a display, a list screen displaying a list of programs, wherein the list of programs includes programs of the plurality of programs, an installed firmware included in the list of programs is a version of a plurality of versions of firmware, and any installed firmware included in the list of programs is activated by a user selection and is not activated automatically;
activating a program of the list of programs based on selection via the list screen by a user; and
automatically activating another firmware that has been installed on the electronic apparatus and excluded from the list of programs.

16. The electronic apparatus of claim 5, wherein the circuitry sets whether to download and update a firmware program having an upgraded function version automatically when the firmware program having the upgraded function version is released from the first server in response to an operation.

17. The electronic apparatus of claim 1, wherein the activated program includes changes to a user interface, and the another firmware does not include changes to the user interface.

18. The electronic apparatus of claim 1, wherein one or more functions of the installed firmware on the electronic apparatus are activated after the installed firmware is updated.

19. The electronic apparatus of claim 1, wherein the plurality of versions includes including a major version, a minor version, a maintenance version and a charged version.

20. The electronic apparatus of claim 19, wherein the circuitry is further configured to activate one or more functions of a program after reception of a user operation for the program in a case that a version of the program is a major version, and
automatically activate the one or more functions in a case that the version is a minor version or a maintenance version.

* * * * *